United States Patent
Gleditsch et al.

(10) Patent No.: US 6,393,332 B1
(45) Date of Patent: May 21, 2002

(54) METHOD AND SYSTEM FOR PROVIDING SUFFICIENT AVAILABILITY OF MANUFACTURING RESOURCES TO MEET UNANTICIPATED DEMAND

(75) Inventors: David B. Gleditsch, Loveland, CO (US); Guillaume J. Schrijnemakers, Meppel (NL); Sharon A. James, Hamilton Square, NJ (US); Barry L. Kulback, Clarksville, TN (US); Roberto E. Bonalumi, Milan (IT); Victor A. Colon, Kendall Park, NJ (US)

(73) Assignee: American Standard Inc., Piscataway, NJ (US)

( * ) Notice: Subject to any disclaimer, the term of this patent is extended or adjusted under 35 U.S.C. 154(b) by 0 days.

(21) Appl. No.: 09/285,314

(22) Filed: Apr. 2, 1999

(51) Int. Cl.[7] .............................................. G06F 19/00
(52) U.S. Cl. ........................................ 700/99; 700/100
(58) Field of Search ....................... 700/95–97, 99–104; 705/8, 10, 7, 9

(56) References Cited

U.S. PATENT DOCUMENTS

| | | |
|---|---|---|
| 4,459,663 A | 7/1984 | Dye |
| 4,646,238 A | 2/1987 | Carlson, Jr. et al. |
| 4,807,108 A | 2/1989 | Ben-Arieh et al. |
| 4,827,423 A | 5/1989 | Beasley et al. |
| 4,885,686 A | 12/1989 | Vanderbei |
| 4,896,269 A | 1/1990 | Tong |
| 4,924,386 A | 5/1990 | Freedman et al. |
| 5,089,970 A | 2/1992 | Lee et al. |
| 5,101,352 A | 3/1992 | Rembert |
| 5,128,860 A | 7/1992 | Chapman |
| 5,128,861 A | 7/1992 | Kagami et al. |
| 5,168,445 A | 12/1992 | Kawashima et al. |
| 5,193,065 A | 3/1993 | Guerindon et al. |
| 5,216,593 A | 6/1993 | Dietrich et al. |
| 5,231,567 A | 7/1993 | Matoba et al. |
| 5,233,533 A | 8/1993 | Edstrom et al. |
| 5,237,496 A | 8/1993 | Kagami et al. |

(List continued on next page.)

*Primary Examiner*—Leo P. Picard
*Assistant Examiner*—Elliot Frank
(74) *Attorney, Agent, or Firm*—Kramer Levin Naftal & Frankel LLP

(57) ABSTRACT

A system and method of scheduling demand for a manufacturing resource in response to a customer order for a product is provided. The system and method includes means for tracking scheduled finished goods orders, existing finished goods inventory, past due finished goods orders, unallocated customer orders and marketing orders, and the manufacturing lead time for the product, among other manufacturing process parameters. The customer order amount and the date requested for the order are entered, and depending on whether the date requested is inside, equal to or outside the manufacturing lead time, manufacturing resources are consumed from one or more of the scheduled finished goods orders, existing finished goods inventory, available to promise amounts, past due finished goods orders, unallocated customer orders, marketing orders, and high flex amounts.

20 Claims, 32 Drawing Sheets

U.S. PATENT DOCUMENTS

| | | |
|---|---|---|
| 5,268,838 A | 12/1993 | Ito |
| 5,278,750 A | 1/1994 | Kaneko et al. |
| 5,287,267 A | 2/1994 | Jayaraman et al. |
| 5,291,397 A | 3/1994 | Powell |
| 5,295,066 A | 3/1994 | Aoki |
| 5,299,115 A | 3/1994 | Fields et al. |
| 5,325,304 A | 6/1994 | Aoki |
| 5,351,195 A | 9/1994 | Sherman |
| 5,369,570 A | 11/1994 | Parad |
| 5,440,480 A | 8/1995 | Costanza |
| 5,446,890 A | 8/1995 | Renslo et al. |
| 5,450,317 A | 9/1995 | Lu et al. |
| 5,463,555 A | 10/1995 | Ward et al. |
| 5,479,343 A | 12/1995 | Matoba et al. |
| 5,546,326 A | 8/1996 | Tai et al. |
| 5,548,518 A | 8/1996 | Dietrich et al. |
| 5,559,710 A | 9/1996 | Shahraray et al. |
| 5,596,502 A | 1/1997 | Koski et al. |
| 5,608,621 A | 3/1997 | Caveney et al. |
| 5,630,070 A | 5/1997 | Dietrich et al. |
| 5,657,453 A | 8/1997 | Taoka et al. |
| 5,671,361 A | 9/1997 | Brown et al. |
| 5,691,895 A | 11/1997 | Kurtzberg et al. |
| 5,699,259 A | 12/1997 | Colman et al. |
| 5,712,985 A | 1/1998 | Lee et al. |
| 5,712,989 A | 1/1998 | Johnson et al. |
| 5,764,519 A | 6/1998 | Tsukishima et al. |
| 5,765,143 A | 6/1998 | Sheldon et al. |
| 5,771,172 A | 6/1998 | Yamamoto et al. |
| 5,787,000 A | 7/1998 | Lilly et al. |
| 5,796,614 A | 8/1998 | Yamada |
| 5,809,479 A | 9/1998 | Martin et al. |
| 5,819,232 A | 10/1998 | Shipman |
| 5,826,040 A | 10/1998 | Fargher et al. |
| 5,826,236 A | 10/1998 | Narimatsu et al. |
| 5,826,238 A | 10/1998 | Chen et al. |
| 5,841,659 A | 11/1998 | Tanaka et al. |
| 5,854,746 A | 12/1998 | Yamamoto et al. |
| 5,862,051 A | 1/1999 | Barbur |
| 5,946,663 A * | 8/1999 | Tanaka et al. .................. 705/8 |
| 5,953,711 A | 9/1999 | Ishizuka |
| 5,983,195 A | 11/1999 | Fierro |
| 5,991,732 A * | 11/1999 | Moslares ....................... 705/8 |
| 5,999,920 A | 12/1999 | Sato et al. |
| 6,272,389 B1 * | 8/2001 | Dietrich ..................... 700/101 |

* cited by examiner

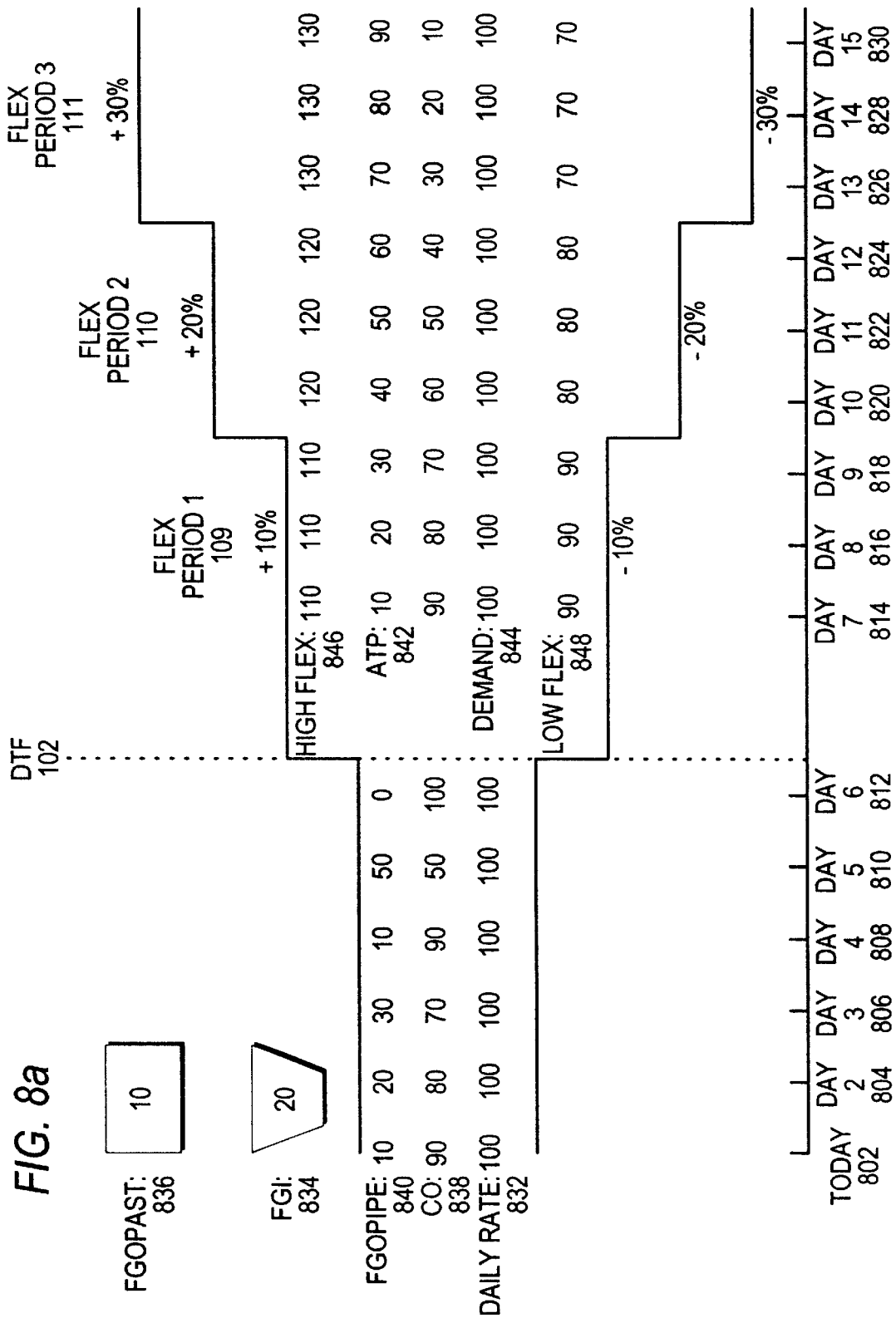

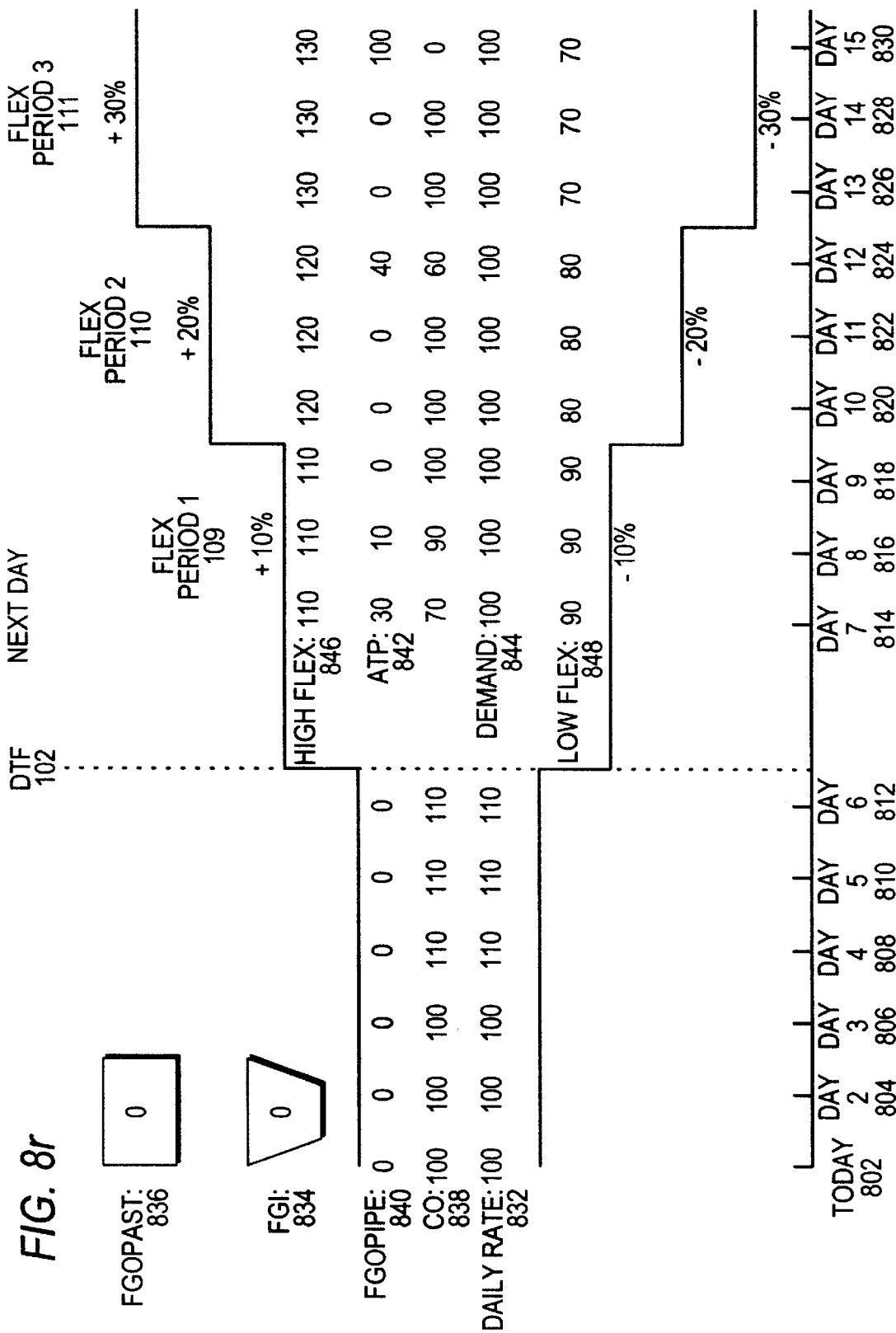

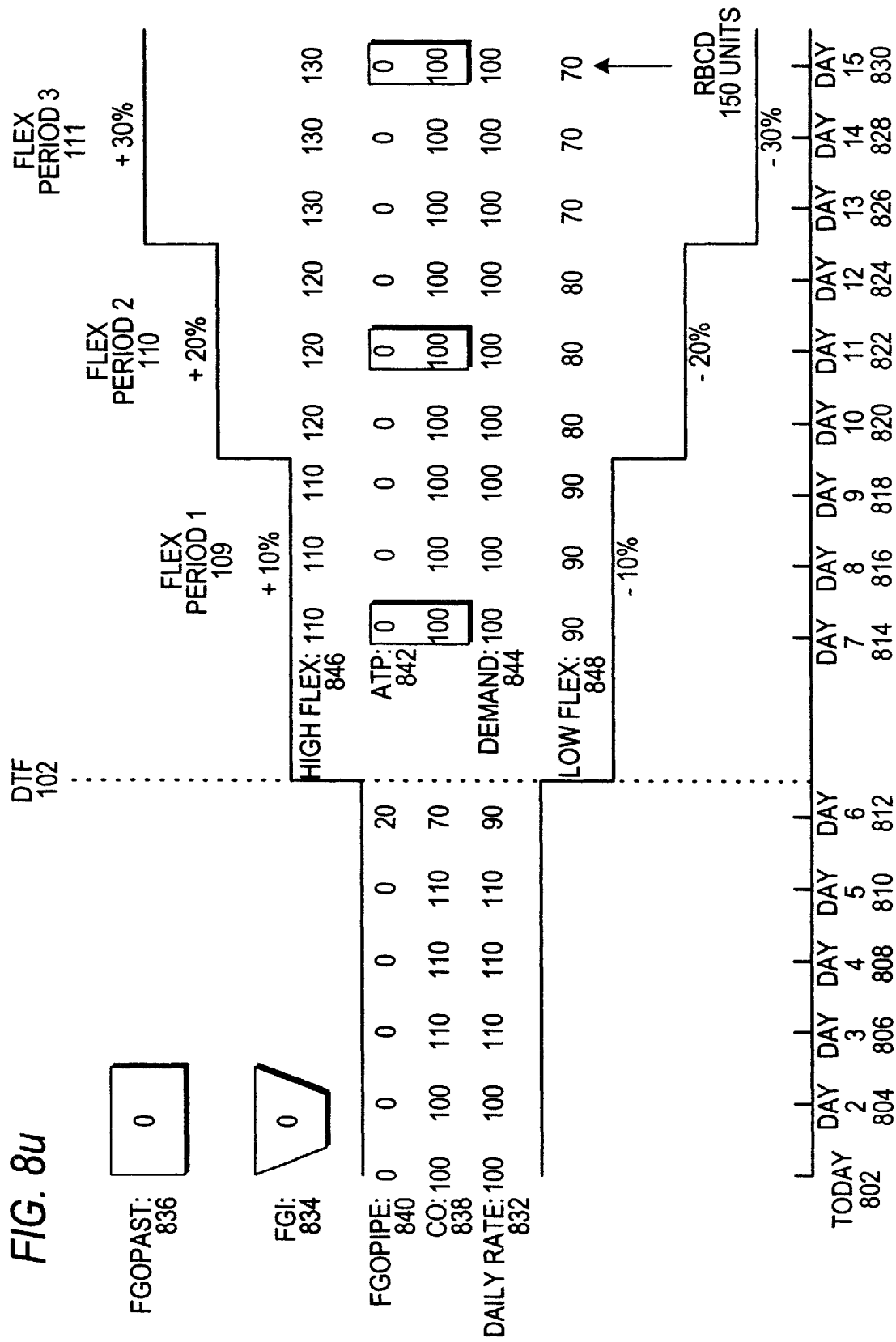

METHOD AND SYSTEM FOR PROVIDING SUFFICIENT AVAILABILITY OF MANUFACTURING RESOURCES TO MEET UNANTICIPATED DEMAND

FIELD OF THE INVENTION

This invention relates to computer systems and methods used in manufacturing resource planning, and, more particularly, to a computer system and method for determining the daily demand for raw materials and other manufacturing resources used in a manufacturing process. The calculation of daily demand by the computer system and method of the present invention is based on anticipated (forecasted) or actual orders for a manufactured product and certain predetermined parameters associated with the manufacturing resources. The results of the computer system and method, i.e., the planned—for demand of manufacturing resources, when used to schedule and allocate manufacturing resources, provides sufficient availability of manufacturing resources to meet unanticipated demand for a manufactured product.

BACKGROUND OF THE INVENTION

In the manufacturing or factory setting, customer orders for various items need to be processed and produced in a certain amount of time (e.g., by a promised shipping date). For every product ordered which is not already in finished goods inventory and therefore available to fill the customer order, a product must be manufactured. To manufacture the product, certain manufacturing resources (such as raw materials, machine or production line time, shift worker hours, and the like) used in a predetermined sequence of events (the manufacturing process) are required. In order to efficiently utilize the manufacturing resources of the manufacturing plant or factory, and ultimately to fulfill a multiplicity of customer orders, the manufacturer generally employs a system and method for scheduling the use of different resources at different dates and times. The resource schedules allow the manufacturer to plan for having sufficient resources available.

In traditional batch manufacturing methods for producing goods, raw materials are ordered well in advance and kept in a stockroom as raw material inventory. Such manufacturing methods typically use a scheduled batch manufacturing technique in which products are scheduled to be created based upon a weekly or monthly planning schedule. Usually these products are produced as subassemblies or fabricated parts that are scheduled based upon the weekly or monthly requirements for finished products. These subassemblies are then assembled into the final product to fill actual customer orders, or to be placed into finished goods inventory.

Once an assembly or fabricated part is scheduled to be produced, a work order is generated, and the parts required to manufacture the assembly or fabricated part are obtained from the stockroom based upon a planned manufacturing start date and order quantity. Subassembly parts are often produced in the same manner as the final product. Thus, after being produced, the subassemblies are stored until they are needed for a final assembly. Because of the length of time of each process, a large inventory of subassembly parts and finished goods is often needed to satisfy an unanticipated or fluctuating customer demand. This scheduled manufacturing process therefore requires a large amount of space for holding raw material inventory, subassembly parts inventory and finished goods inventory. Additionally, storing such large amounts of inventory results in additional costs related to loss and damage to raw materials, subassemblies and finished goods over time.

Computer software programs have been developed to efficiently accomplish many of the calculations used in batch manufacturing systems by materials planners in a manufacturing company to schedule and track raw materials inventory, batch subassemblies and fabricated parts. Typically, such computer software programs can calculate and determine, and even generate purchase orders, for obtaining the anticipated amount of raw materials required based on the planning schedule input by the materials planners. These computer software programs can also assist in the scheduling of manufacturing resources other than raw materials, such as the scheduling of manufacturing production lines and shift worker crews.

Other scheduling methods have been developed to assist in the planning of the acquisition of raw materials required in the manufacturing processes that utilize manufacturing methodologies other than batch manufacturing methods. Computer scheduling systems that employ these scheduling methods are generally referred to as materials requirement planning (MRP) systems. Typically, MRP scheduling systems assume an infinite capacity of machinery, shift worker hours, and the like, and the MRP system determines the amounts and types of raw materials that must be on hand at particular dates/times for a given manufacturing plant with given forecasted or actual orders.

Manufacturing resource planning (MRP II) systems, an improvement over the typical MRP systems, may also be used to schedule and allocate all kinds of manufacturing resources. MRP II systems generally also use customer orders and marketing forecasts to determine the quantity of manufacturing resources needed at any given time to produce anticipated customer orders. In MRP II systems, the number of days that it takes to manufacture a product from the time the initial manufactured components or subassemblies are produced until the final product is shipped is called the manufacturing lead time or pipeline. A long lead-time, caused by the subassembly manufacturing process, may make it difficult to react quickly to unanticipated customer orders. The lengthy process of long manufacturing lead times, queues for each subassembly, and frequent trips to the stockroom to obtain materials will introduce long periods of delay between manufacturing steps, and thus, a long period of time between the customer's order and the completion and shipment of that order.

One of the more significant problems of these MRP II systems is that the production schedule is created well in advance, and cannot be altered easily. In addition, the computer software programs used in these processes generally lack the ability to easily adjust schedules when conditions change. If the manufacturing process is to become more flexible, the computer software programs used for scheduling should also become more flexible. In the typical MRP II system, however, the production quantity, or total demand on resources, is manually set by a master scheduler, and cannot easily be adjusted.

Therefore, prospective scheduling systems have been developed which identify where and when resource magnitude or timing constraints will be violated if a certain number of orders are received so that these violations may be resolved before they actually happen. However, relationships and constraints associated with products and processes must be accurately modeled in these systems if they are to predict future events with any degree of precision. Models can include process yield and probability factors, but cannot predict random events such as equipment failure, missing parts, or bad weather. Yet, random events must be considered and planned for in advance so that excess material and capacity stores can be used to prevent bottlenecks. The use of alternative resources can also prevent bottlenecks. In either case, timely recognition and response (i.e., scheduling around) is essential to maintaining productivity.

In any manufacturing environment, timely and precise resource plans and schedules are often a critical success factor. Material requirements planning systems enhanced with the above considerations can be used to determine future material requirements and potential shortages due to changing conditions and unexpected events, including unanticipated customer orders. The result of a successfully implemented system would be to reduce inventory and minimize material disruptions. However, even these kinds of material requirements planning systems function well only with definite and planned requirements (i.e., manufacturing systems in which products are built to meet forecasted amounts rather than actual customer orders), and where design changes (and therefore, changes in the manufacturing process and/or type and amount of raw materials) are infrequent.

Additionally, increased manufacturing flexibility, particularly in a factory that produces more than one product, creates a need for long term resource planning strategies based on production capacity and anticipated product mix. Similar scheduling methods may be applied to control other business operations including production capacity, distribution, equipment maintenance, and shop floor scheduling. Frequent adjustments to schedules may be required because small changes in requirements, status, products, processes or their constraints may result in dramatic changes to the requirements for many different resources.

It is thus apparent that there is a need for an improved system and method for automatically calculating the prospective total daily demand for manufacturing resources and automatically adjusting the demand, based on parameters relating to the resource, to accommodate unanticipated customer orders or other changes to the manufacturing process (including changes in the availability of raw materials). There is a further need for such a system that can allocate and schedule manufacturing resources to produce the maximum number of customer orders while minimizing the overhead and costs associated with maintaining excess resource inventory for capacity. The present invention meets these and other needs.

SUMMARY OF THE INVENTION

Generally speaking, in accordance with the present invention, an improved method and system to prospectively determine the daily demand for manufacturing resources in a manufacturing system is provided. More specifically, the method and system of the invention provides a projection of demand on manufacturing resources over time based on one or several of actual customer orders, future forecasts of customer orders, historical data of past customer shipments, current amounts of finished goods inventory, and predefined parameters related to the manufacturing resources.

The method and system is able to calculate when certain amounts of raw materials or other manufacturing resources are going to be needed based on when a customer order needs to be filled, and hence the system and method can additionally determine the date when the manufacturer needs to purchase or produce raw materials, refills, and the like (based on known supplier or manufacturing lead time), and plan to make those other resources available to produce the goods in time to meet a promised shipping date for an order to the customer. The invention therefore manages materials and other resources and may integrate the planning of manufacturing resources with an order acknowledgement system.

Furthermore, the method and system can allocate and schedule manufacturing resources, such as machine time or production line utilization, in a manner which minimizes waiting time of items to be fabricated, increases the productive use of the machine (i.e., decreases waste or leftover machine time) and maximizes the flexibility of the machine to support demand for several different products. For example, in a firing step of the factory process, it is ideal to place a maximum amount of items in a kiln each time the kiln is used. The system and method of the invention allows the kiln resource to be used (consumed) by more than one product at a time. The invention therefore provides efficient manufacturing resource plans that support customer demand requests over many products.

The system includes a database for storing predefined parameters, information about customer orders, and historical data. An input device is provided which allows an operator of the system to enter the parameters or other information. Alternatively, the input device may be linked to the output from various controlling mechanisms in the manufacturing process. An output device is provided to generate reports detailing the planned allocation of resources. In the case where raw materials are allocated for scheduled production, the output device may generate purchase orders. Alternatively, the output device may be linked to the input from various controlling mechanisms in the manufacturing process, or even linked to an ordering system of suppliers or customers.

The above and other aspects of the invention are accomplished in an improved method and system that determines the total demand for a manufacturing resource for each day over several time periods specified by the user of the system. For example, within the first time period, from the current date (i.e., today) up to a demand time fence (i.e., the manufacturing lead-time), the total demand may be altered, even though a quantity of products is already in production. The system of the invention utilizes minimum and maximum finished goods inventory targets to either supply additional products or consume excess products being made. Additionally, products with a delayed specific identity, i.e., generic finished goods orders, can be interchanged among related products within a generic finished goods order family prior to the step in which the product becomes unique.

For several periods beyond the demand time fence, called flex fence periods, the total demand for each day can vary by a percentage amount or a fixed number up and a percentage amount or a fixed number down (which percentage or number may be the same or may be different) determined by the user for each product. Each period can have a different percentage, for example, and each period can have a different number of days, however all days within a period use the same flex percentage for the period. The percentage amounts or fixed numbers represent planned-for excess capacity for which resources are made available in order to meet customer orders for the product that exceed forecasted amounts. The flex fences create available resource capacity that moves in the direction of solid customer order trends, and is determined by a number that includes weighted factors for one or more of current production amounts, future order forecasts and past customer shipment history.

Once the quantities within the flex periods have been determined, the system produces a plan for ordering raw materials and scheduling other manufacturing resources sufficient to build the total anticipated demand plus the flex fence demand. Thus the system creates the flexibility to fill customer orders up to the amounts determined by the upper flex fences.

If an order is received for a date beyond the demand time fence, and the order is larger than the total anticipated demand and the additional flex demand (called the high flex amount) for that date, the system and method can recalculate total demand for all days beyond the demand time fence date and prior to the order date to attempt to produce the total demand quantity necessary to fulfill the order in a process known as smoothing. In calculating the demand for manufacturing resources up to the flex fence amounts, the system uses an algorithm that adjusts the quantities in a manner that prevents the total demand quantity for any day from exceeding the amount of raw material and other resources that was planned to be available for that day. Therefore, unanticipated customer orders outside of the high flex amounts on the order date can be met, even though the manufacturer has only the flex amount of excess resource capacity and materials, by smoothing the demand over prior days.

The improved system and method of the invention also provides for intermediate reporting of the status of customer and finished goods replenishment orders at various points during the production pipeline. If a problem occurs, it is immediately recognized and reported so that the system can take an action to attempt to resolve the problem, such as by consuming demand for resources from other stores, e.g., from non-committed customer orders or marketing orders, available-to-promise amounts, finished goods inventory or finished goods replenishment orders.

The method and system of the invention may also solve a wide variety of resource management problems. Resources which may be managed include raw materials, machine or production line time, shift worker hours, other labor, space, power, or any other quantity whose constraint affects the ability to accept orders for the delivery of goods or services.

For example, in construction work, the scheduled use of resources may include construction workers with general or specialized skills, various single task or multi-purpose equipment, and materials requirements; in transportation, the efficient use of special or general purpose vehicles to transport people, materials, and equipment between a multitude of locations; in health care, the scheduled use of beds, operating rooms, general or specialized staff, and fixed or mobile equipment. Other uses of the system and method of the invention will readily be apparent to those who understand the embodiments disclosed herein.

Accordingly, it is an object of this invention to provide a system and method for planning, scheduling and allocating manufacturing resources in order to maximize manufacturing flexibility to meet unanticipated customer orders while minimizing the inventory costs and other costs associated with maintaining excess capacity of such resources.

Another object of the invention is to provide a system and method which may generate order acknowledgement projections based on whether sufficient manufacturing resources may be allocated in time to produce a customer order by a customer requested build completion date.

A further object is to provide a system and method which calculates when manufacturing resources are going to be needed and, hence, in what amount a manufacturer should buy raw materials, plan machinery time and schedule shift workers to operate the manufacturing line.

Yet another object is to provide a system and method which takes into account the capacity of each machine and staffing pool of the plant. To that end, each manufacturing resource is assigned a manageable amount of work and is not overloaded with assignments. In a like manner, reasonable amounts of the inventory of raw materials and subassemblies are calculated and maintained on hand in order to provide sufficient capacity to meet unanticipated demand, while minimizing the carrying costs and risk of damage or loss of such inventory.

Yet a further object of the invention is to provide a system and method that provides management of a company with detailed resource analysis information and plans.

Still yet another object of the invention is to provide a system and method that may modify order acknowledgement and resource planning projections each time new information is input.

Still other objects and advantages of the invention will in part be obvious and will in part be apparent from the following detailed specification.

The invention accordingly comprises the several steps and the relation of one or more such steps with respect to each of the others, and the system embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Various embodiments and examples of the present invention and its advantages are best understood by referring to FIGS. 1 through 8v of the drawings, like numerals being used for like and corresponding parts within the various drawings. The following description, while providing a detailed disclosure of the present invention, also describes the general principles of the present invention.

Figure 1:
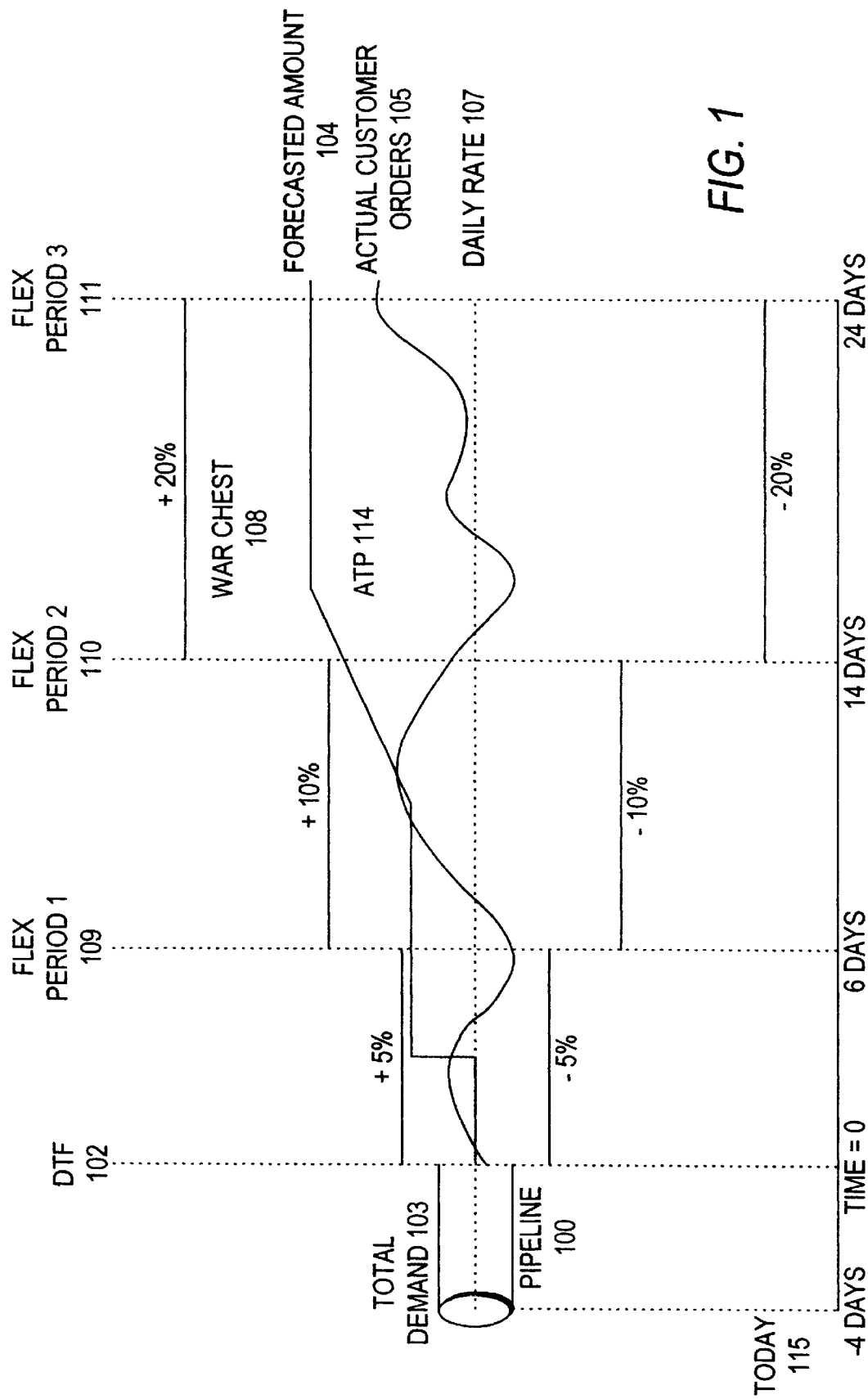
FIG. 1 depicts a schematic representation of a daily demand management model in accordance with an embodiment of the invention.

The underlying paradigm for the system and method of the invention is a daily demand management model. FIG. 1 depicts a schematic representation of a daily demand management model in accordance with the invention. A manufacturing process lead-time, or pipeline 100 represents the amount of time necessary to produce a customer order from assembly of raw materials to finishing of the finished product. At the end of pipeline 100 is a demand time fence, DTF 102. Only the amount of manufacturing resources that pass DTF 102 can be used to produce products in pipeline 100. Generally, the amount of manufacturing resources scheduled to pass DTF 102 and enter pipeline 100, or the total demand 103, will be equal to the greater of forecasted amount 104 or actual customer orders 105 for each day. The daily rate 107 is the rate at which manufacturing resources are consumed, and at DTF 102 is set equal to total demand 103. The difference between forecasted amount 104 and actual customer orders 105 is the amount of products that are available to promise, ATP 114 to fulfill other customer orders.

In order to ensure that manufacturing resources are available to meet forecasted amount 104 and/or fluctuating actual customer orders 105, a war chest 108 of manufacturing resources is accumulated. War chest 108 should be sufficient to accommodate forecasted amount 104 and actual customer orders 105 and yet be small enough to minimize the carrying costs of excess inventory and other manufacturing resources. A known technique for planning war chest 108 involves setting flex fences which represent a percentage or an amount above and below daily rate 107 in which customer orders can be met.

While the known methods of planning flex amounts depend on the current daily rate at the demand time fence, it has been seen that this can result in dramatic moves up and down from day to day which can have adverse consequences for planning the availability of manufacturing resources. Actual order rates for any particular product can have significant, and natural noise—monthly or quarterly averages are predictable, but any one day can vary dramatically from the average. In the system and method of the invention herein, flex fences are based on a compound number having weighted components of one or more of the average daily rate of demand over the pipeline, the forecasted amount of customer orders and an historical daily rate of past shipments. Therefore, flex fences move in the direction of demand on solid trends, not just daily noise or anomalies. They can be adjusted easily to focus on the priorities that are most relevant at the time—current production, future forecast, past history—or any combination of one or more thereof.

Typically, three flex periods are used wherein each period represents a number of days beyond DTF 102, and the flex amount increases in each period. As shown in FIG. 1, flex period 1 109 lasts for six days and has a flex amount of 5%. Flex period 2 110 lasts for eight days and has a flex amount of 10%. Flex period 3 111 lasts for ten days and has a flex amount of 20%. Therefore, manufacturing resources sufficient for customer orders up to 5% greater than current daily rate 107 can be scheduled to be available within six days of DTF 102. Similarly, manufacturing resources sufficient for customer orders up to 10% greater than current daily rate 107 can be scheduled to be available within fourteen days of DTF 102. Finally, manufacturing resources sufficient for customer orders up to 20% greater than current daily rate 107 can be scheduled to be available within twenty-four days of DTF 102.

Therefore, total demand 103 for a given manufacturing resource for each day is calculated over flex fence periods 109, 110 and 111 input by the user of the program. Between the current date, today 115, up to DTF 102, the total demand cannot generally be altered, since this quantity of products is already in production and it takes a fixed number of days to complete production of the product. For flex fence periods 109, 110 and 111, total demand 103 for each day can vary by, for example, the percentage amounts determined by the user for that product. Each flex period can have a different percentage, and each flex period can have a different number of days, however all days within a flex period generally use the flex percentage during the period.

Once the quantities within flex periods 109, 110 and 111 have been determined, the system produces plans for raw material and creates daily demand requirements for other manufacturing resources sufficient to build the total anticipated demand plus the flex fence amount. If an order is received for a date beyond DTF 102, and the order is larger than the total flex demand for that date, the system recalculates total demand for days beyond DTF 102 and prior to the scheduled order date to attempt to schedule manufacturing resources to be available to produce the total demand quantity necessary to fulfill the order in a process known as smoothing the demand.

Yet another problem remains in known systems and methods utilizing flex fences. If flex fences are not set properly, unwanted finished goods inventory can be created. Compounding this problem, if order rates for a given product are lower than the daily rate, finished goods replenishment orders well beyond a prudent finished goods inventory level will be produced. Furthermore, if order rates for a given product are high, there is no way in the known systems and methods to create finished goods inventory to cover orders that fall within the pipeline.

The system and method of the invention utilizes a smoothing process that comprises a computer and software programming an algorithm for smoothing the demand for manufacturing resources for a product over time. The smoothing process receives customer orders from a typical order management system and may allocate and schedule demand for manufacturing resources to produce that customer order. Different order policies, also known as consumption policies, require different algorithm steps for determining the date on which a product can be built and the quantity of products that can be built on any given date.

The forecast consumption policy is used to maximize response to customer demand while maintaining minimum inventories of manufacturing resources. As described with respect to FIG. 1, flex fences 109, 110 and 111 are used outside DTF 102 to provide war chest 108 of raw materials to meet demand that is greater than was forecast. For this consumption policy, finished goods replenishment orders are created towards producing a minimum finished goods inventory target, and this finished goods inventory is used in case customer orders arrive inside demand time fence 102 (i.e., in less than the time it takes to manufacture the product).

Figure 2:
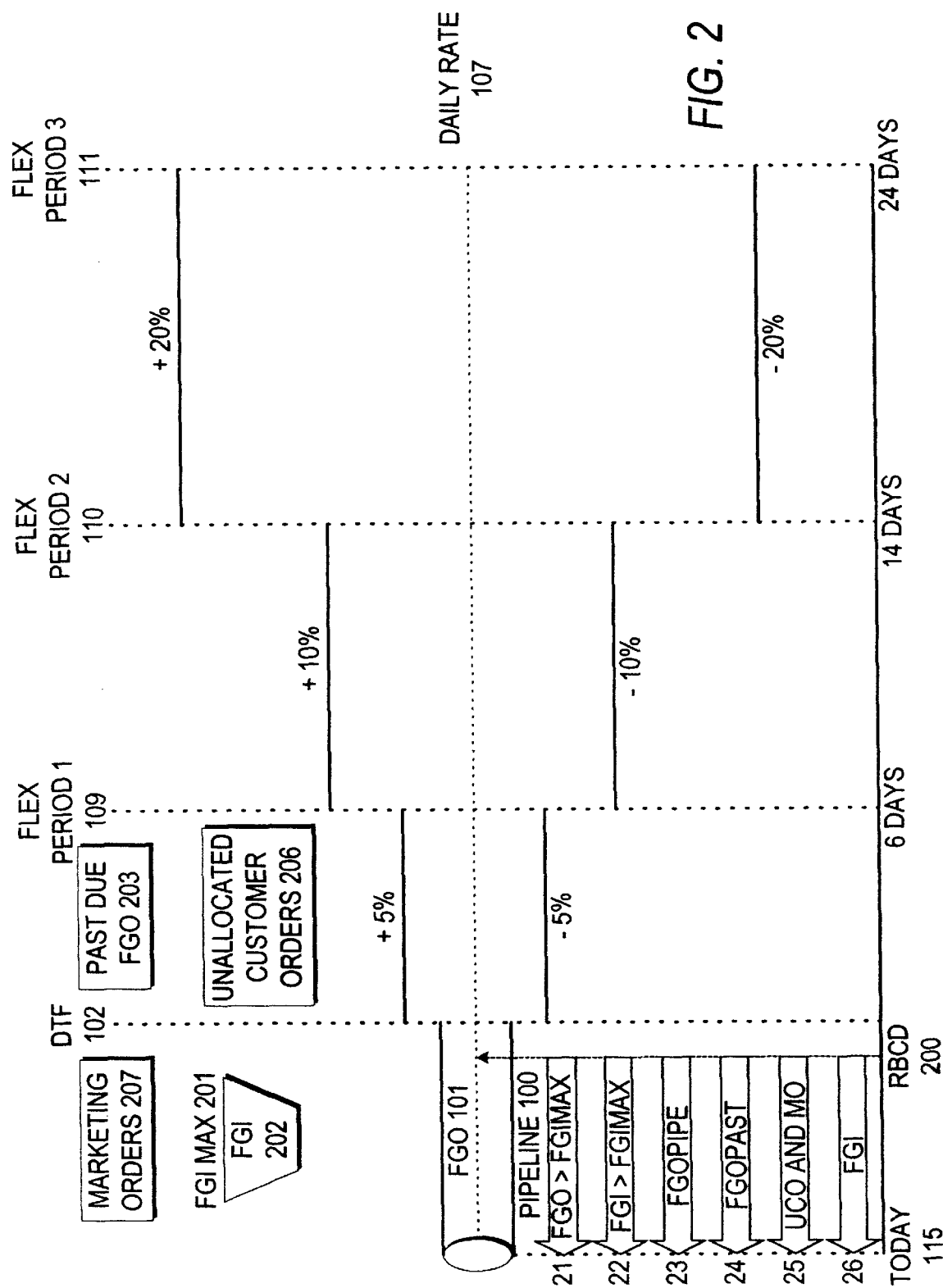
FIG. 2 depicts a schematic representation of algorithm steps used in a forecast consumption policy when a request to build completion date is inside the demand time fence, in accordance with an embodiment of the invention.

The algorithm steps for forecast consumption policy where a customer requested build completion date, RBCD 200 is inside DTF 102 are described with reference to FIG. 2. At a first step 21, finished goods replenishment orders, FGO 101, in pipeline 100 that would cause a finished goods inventory maximum target, FGI Max 201 to be exceeded are consumed from RBCD 200 to today 115 sequentially (move right to left). That is, calculate current finished goods inventory, FGI 202 plus FGO 101 in pipeline 100 and consume FGO 101 that would cause FGI 202 plus FGO 101 to be greater than FGI Max 201. In a next step 22, FGI 202 above FGI Max 201 is then consumed. In a next step 23, remaining FGO 101 in the pipeline from RBCD 200 to today 115 is consumed sequentially (move right to left). In a next step 24, past due FGO 203 is consumed. In a next step 25, unallocated customer orders 206 and any scheduled marketing orders 207 are consumed from RBCD 200 to today 115 sequentially (move right to left). In a next step 26, remaining FGI 202 is consumed.

If demand is still not satisfied, an RBCD violation is generated telling the user that the customer order cannot be satisfied by the date promised. The system can alternatively move the promised order date from left to right, and consume unallocated customer orders and marketing orders sequentially until the entire demand is satisfied. The system then reports the order completion date to the user.

Figure 3:
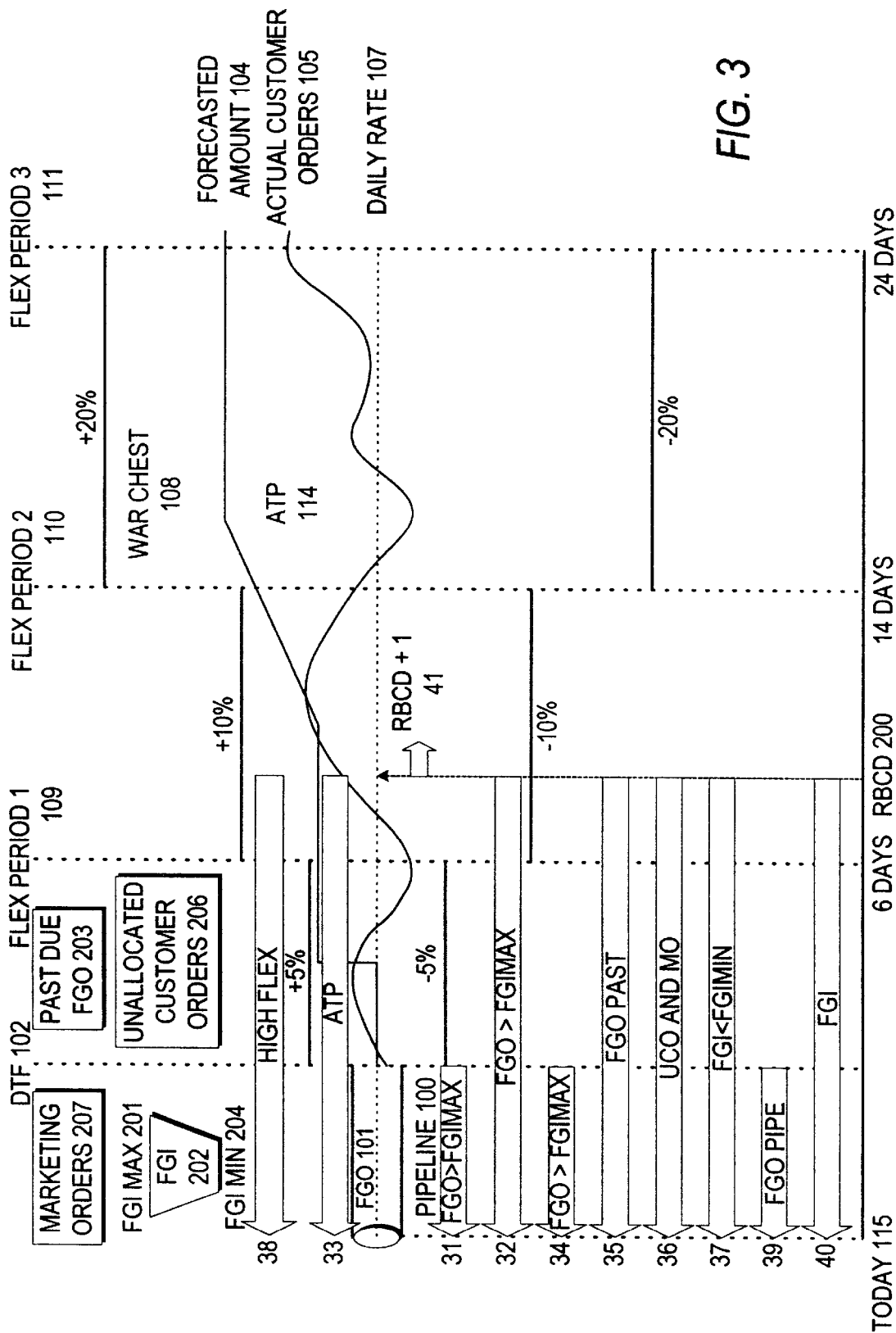
FIG. 3 depicts a schematic representation of algorithm steps used in a forecast consumption policy when a request to build completion date is outside the demand time fence, in accordance with an embodiment of the invention.

FIG. 3 shows the algorithm steps where RBCD 200 is outside demand time fence 102. At a first step 31, FGO 101 in pipeline 100 that would cause a FGI Max 201 to be exceeded are consumed sequentially from DTF 102 to today 115 (move right to left). That is, calculate current FGI 202 plus FGO 101 and consume FGO 101 that would cause FGI 202 plus FGO 101 to be greater than FGI Max 201. In a next step 32, FGI 202 above FGI Max 201 is then consumed. In a next step 33, ATP 114 is consumed sequentially from RBCD 200 to today (move right to left). In a next step 34, FGO 101 in pipeline 100 that would cause FGI Min 204 to be exceeded is consumed sequentially from DTF 102 to today 115 (move right to left). In a next step 35, past due FGO 203 is consumed. In a next step 36, unallocated customer orders 206 and any scheduled marketing orders 207 are consumed sequentially from RBCD 200 to today 115 (move right to left). In a next step 37, FGI 202 above FGI Min 204 is consumed.

If demand has not been satisfied, available high flex amounts are consumed sequentially from RBCD 200 to today in a step 38 (move right to left). Available high flex amounts are the maximum amounts for which manufacturing resources have been planned. They are determined by the flex amounts in any given flex period, as described with reference to FIG. 1. In a next step 39, remaining FGO 101 in pipeline 100 is consumed sequentially from DTF 102 to today 115 (move right to left). In a next step 40, remaining FGI 202 is consumed.

If demand is still not satisfied, an RBCD violation is generated telling the user that the customer order cannot be satisfied by the date promised. The system can alternatively move the promised order date from left to right at a step 41, and consume unallocated customer orders 206, marketing orders 207, ATP 114 and high flex amounts sequentially until the entire demand is satisfied. The system then reports the revised order completion date to the user.

The forecast policy is often used to handle seasonal ramp up in a manufacturing facility where sales forecast by season greatly exceeds production capacity. It is also used when the vast majority of orders are received within the demand time fence. In these cases, no flex fences are used outside DTF 102, so there are only enough manufacturing resources planned to produce up to forecasted amount 104. In addition, FGO 101 is created to meet a minimum FGI target 204.

Figure 4:
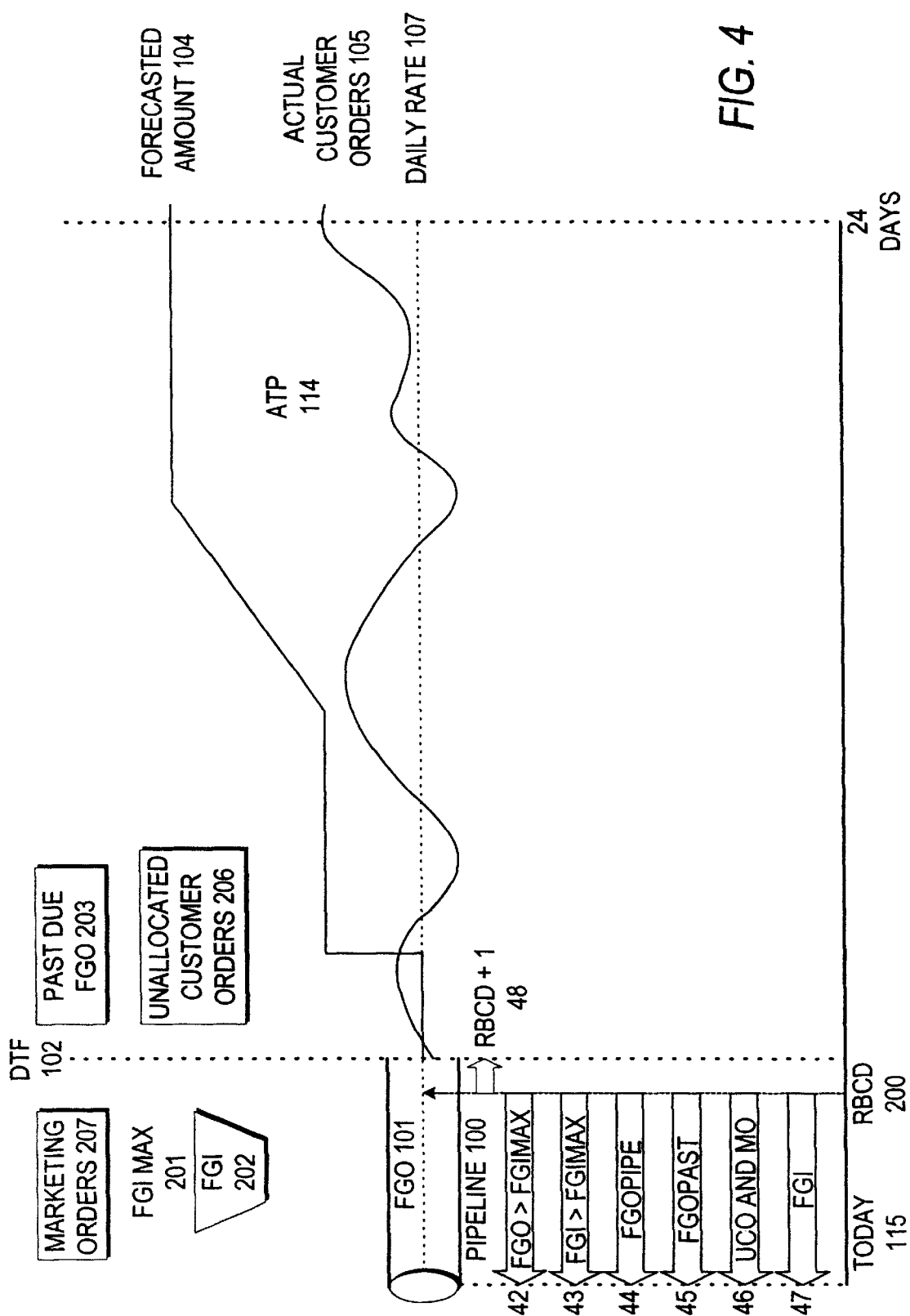
FIG. 4 depicts a schematic representation of algorithm steps used in a forecast policy when a request to build completion date is inside the demand time fence, in accordance with an embodiment of the invention.

The algorithm steps for the forecast policy where RBCD 200 is inside demand time fence 102 are described with reference to FIG. 4. At a first step 42, FGO 101 in pipeline 100 that would cause FGI Max 201 to be exceeded are consumed sequentially from RBCD 200 to today 115 (move right to left). That is, calculate current FGI 202 plus FGO 101 in the pipeline and consume FGO 101 that would cause FGI 202 plus FGO 101 to be greater than FGI Max 201. In a next step 43, FGI 202 above FGI Max 201 is consumed. In a next step 44, remaining FGO 101 in pipeline 100 from RBCD 200 to today 115 is consumed sequentially (move right to left). In a next step 45, past due FGO 203 is consumed. In a next step 46, unallocated customer orders and any scheduled marketing orders are consumed sequentially from RBCD 200 to today 115 (move right to left). In a next step 47, remaining FGI 202 is consumed.

If demand is not satisfied, an RBCD violation is generated telling the user that the customer order cannot be satisfied by the date promised. The system can alternatively move the promised order date from left to right at a step 48, and consume unallocated customer orders and marketing orders sequentially until the entire demand is satisfied. The system then reports the order completion date to the user.

Figure 5:
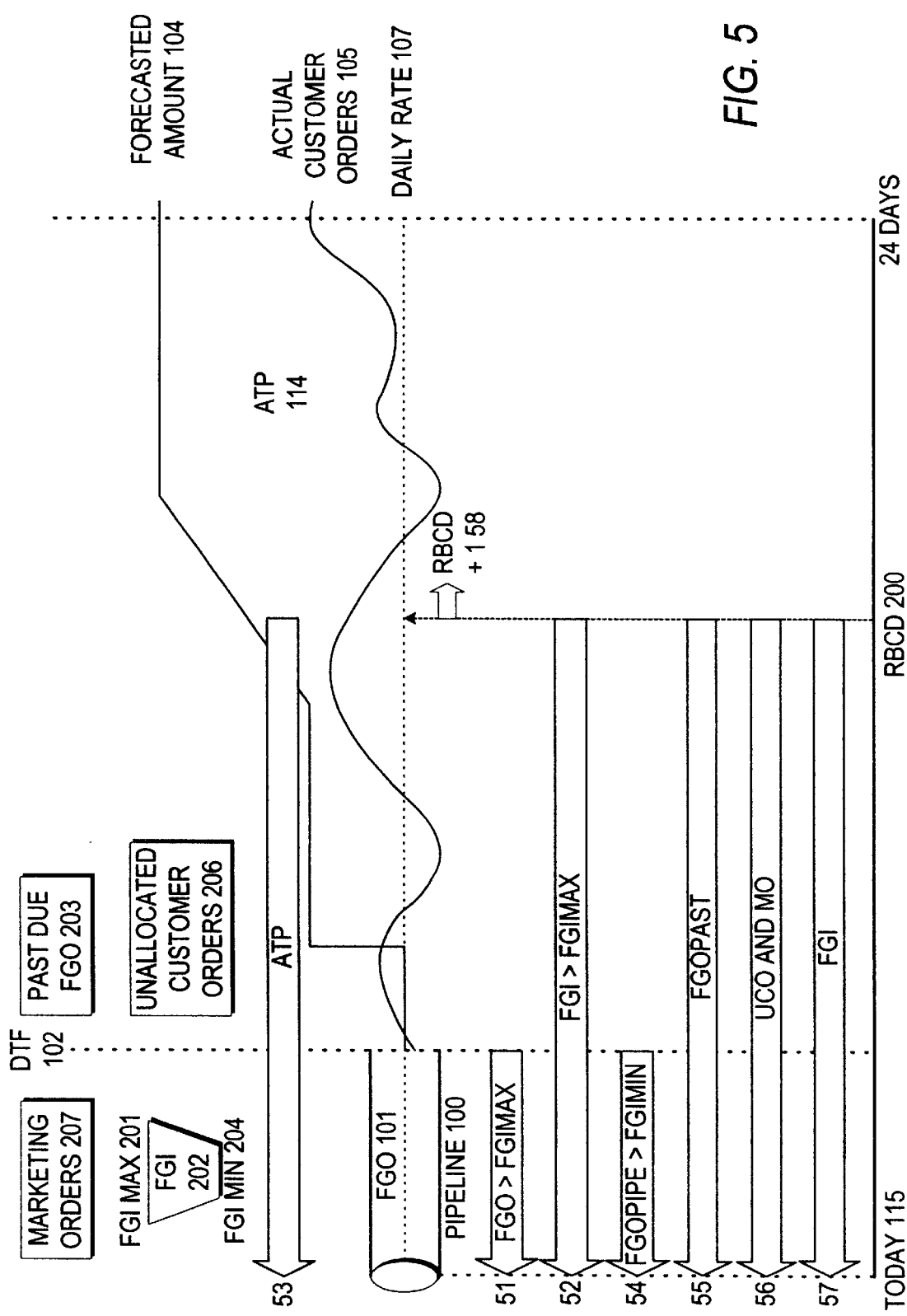
FIG. 5 depicts a schematic representation of algorithm steps used in a forecast policy when a request to build completion date is outside the demand time fence, in accordance with an embodiment of the invention.

FIG. 5 shows the algorithm steps where RBCD 200 is outside demand time fence 102. At a first step 51, FGO 101 in pipeline 100 that would cause FGI Max 201 to be exceeded are consumed sequentially from DTF 102 to today 115 (move right to left). That is, calculate current FGI 202 plus FGO 101 in pipeline 100 and consume FGO 101 that would cause FGI 202 plus FGO 101 to be greater than FGI Max 201. In a next step 52, FGI 202 above FGI Max 201 is consumed. In a next step 53, ATP 114 is consumed sequentially from RBCD 200 to today (move right to left). In a next step 54, remaining FGO 101 in pipeline 100 is consumed sequentially from DTF 102 to today 115 (move right to left). In a next step 55, past due FGO 203 is consumed. In a next step 56, unallocated customer orders 206 and scheduled marketing orders 207 are consumed sequentially from RBCD 200 to today 115 (move right to left). In a next step 57, remaining FGI 202 is consumed.

If demand has not been satisfied, an RBCD violation is generated telling the user that the customer order cannot be satisfied by the date promised. The system can alternatively move the promised order date at a step 58 from left to right, and consume unallocated customer orders 206, marketing orders 207 and ATP 114 sequentially until the entire demand is satisfied. The system then reports the revised order completion date to the user.

The actual order policy is used for low-volume products with sporadic demand. In this case, forecasted amounts 104 are not applicable. No flex fences exist outside DTF 102. FGO 101 in pipeline 100 and FGI 202 are not planned; they only exist when a customer order is placed (in the case of FGO 101) and if that order is subsequently canceled inside DTF 102 (in the case of FGI 202).

Figure 6:
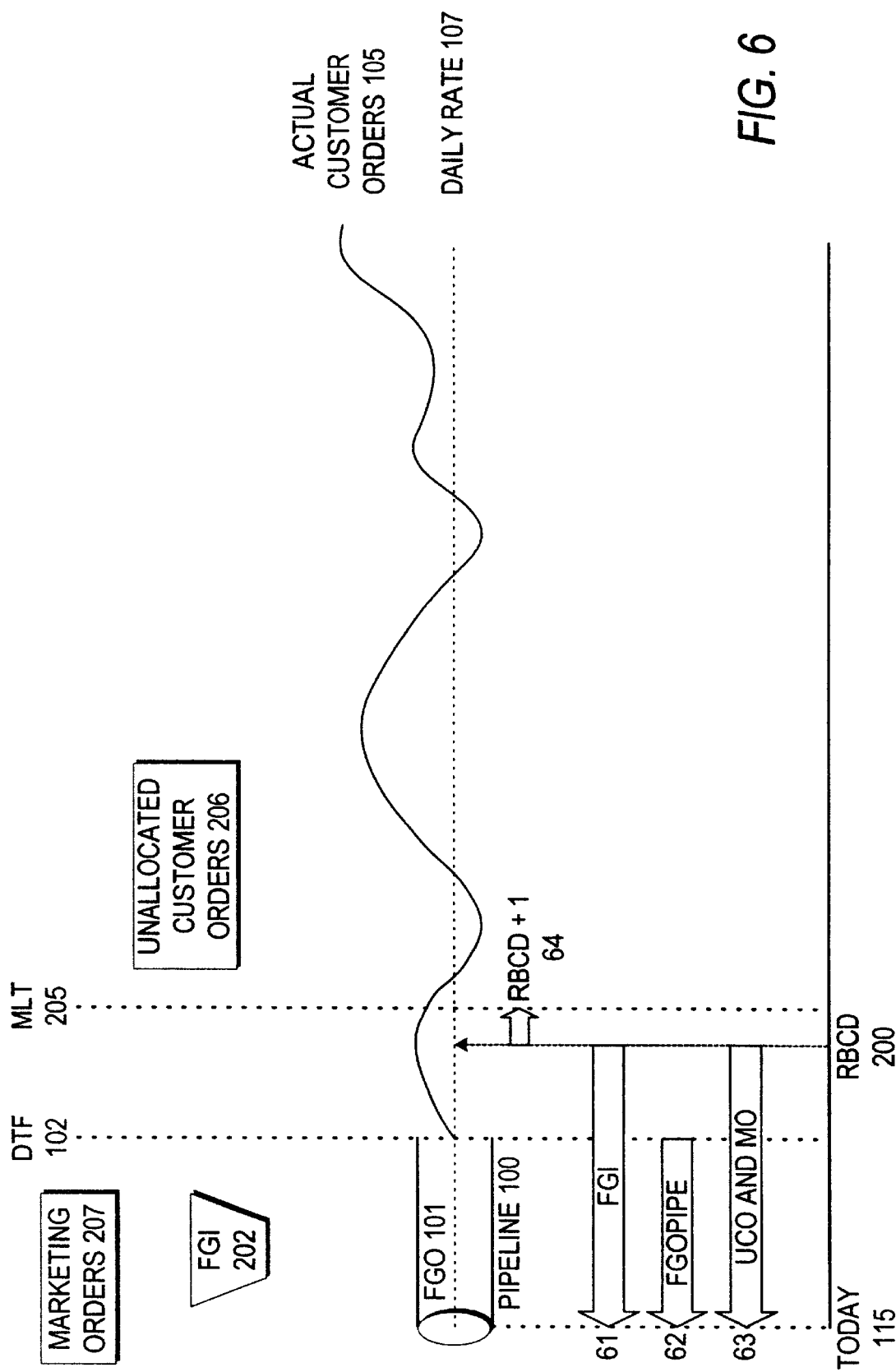
FIG. 6 depicts a schematic representation of algorithm steps used in an actual order policy, in accordance with an embodiment of the invention.

The algorithm steps for actual order policy are described with reference to FIG. 6. At a first step 61, FGI 202, if any, is consumed. In a next step 62, FGO 101 in pipeline 100 is consumed sequentially from DTF 102 to today 115 (move right to left). In a next step 63, unallocated (i.e. canceled) customer orders 206 and any marketing orders 207 are consumed sequentially from RBCD 200 to today 115 (move right to left).

If demand is not satisfied, and RBCD is less than the manufacturing lead time, MLT 205, or the time necessary to accumulate all the raw materials and schedule the other manufacturing resources to produce customer orders, an RBCD violation is generated telling the user that the customer order cannot be satisfied by the date promised. The system can alternatively move the promised order date at a step 64 from left to right, and consume unallocated customer orders and marketing orders sequentially until the entire demand is satisfied or until MLT 205 is crossed. The system then reports the revised order completion date to the user.

Several optional enhancements to the smoothing process described allow the system and method of the invention to adapt to various conditions that may be present in any given manufacturing process. These modifications include Available to Promise Family, Package Quantity, Smoothing Time Left Fence, Pegging and Generic Finished Goods Order Family.

Available to Promise Family: Certain parts may belong to an "ATP Family" and can share each other's forecasted amounts. This provides flexibility to produce customer demand that does not correspond to what is forecasted for a particular product by consuming demand from another product in the ATP Family. Thus, the amount of raw material to be kept on hand for any individual product may be decreased. This is represented in the demand based management model of the invention in a lowering of the flex fence amounts for products within an ATP Family. Typically, the algorithm would be modified to first consume ATP for the product ordered and then consume shared ATP from other parts in the ATP Family for the same day.

Package Quantity: Some customers require that an order be shipped in multiples of a package quantity. Thus, the consumption rules of the algorithm are modified so that the amount consumed in any category on a given day is a multiple of this package quantity.

Smoothing Time Left Fence: Smoothing Time Left Fence prevents an ordered product with a RBCD that is far in the future from consuming FGI 202, FGO 101 in pipeline 100 and ATP 114 in the period of time close to DTF 102. The smoothing time left fence length is offset from the customer requested build completion date to determine the date beyond which no smoothing occurs. If the smoothing time left fence date is outside DTF 102, then nothing is consumed between the left of the smoothing time left fence date and DTF 102. If the smoothing time left fence date is inside DTF 102, then normal consumption rules apply.

Pegging: Pegging allows a specific unit being produced to be assigned to a specific customer order. A hard pegged order will have a specified unit ID (and perhaps an actual label, tag or other distinguishing feature) assigned to each part; and its relationship is hard and binding. No other customer order may be assigned to this part when smoothing occurs. This will have the effect of reducing the apparent amount of manufacturing resources available outside DTF 102. Soft pegged orders may be assigned and reassigned to any customer order that is soft pegged. Soft pegged orders follow regular smoothing logic.

Generic Finished Goods Order Families: To the immediate left of DTF 102 there may be a window of time where FGO 101 for several products may be considered generic. These products are interchangeable inside DTF 102 until some distinctive process, such as punching or spraying, is performed. This new time fence, or the window of generic opportunity, is the generic finished goods order time fence. Once FGO 101 leave this window, the opportunity for demand from another product to consume it disappears. However, while within the generic finished goods order time fence, the product can be consumed by any product in the generic finished goods order family.

Additionally, while the time periods discussed with respect to the demand time fence and flex fences were in one day intervals, the system and method of the invention allows for smaller or larger time period intervals to be used. Thus, for example, each day can be divided into three shifts and resources consumed and allocated for each shift separately.

Figure 7A:
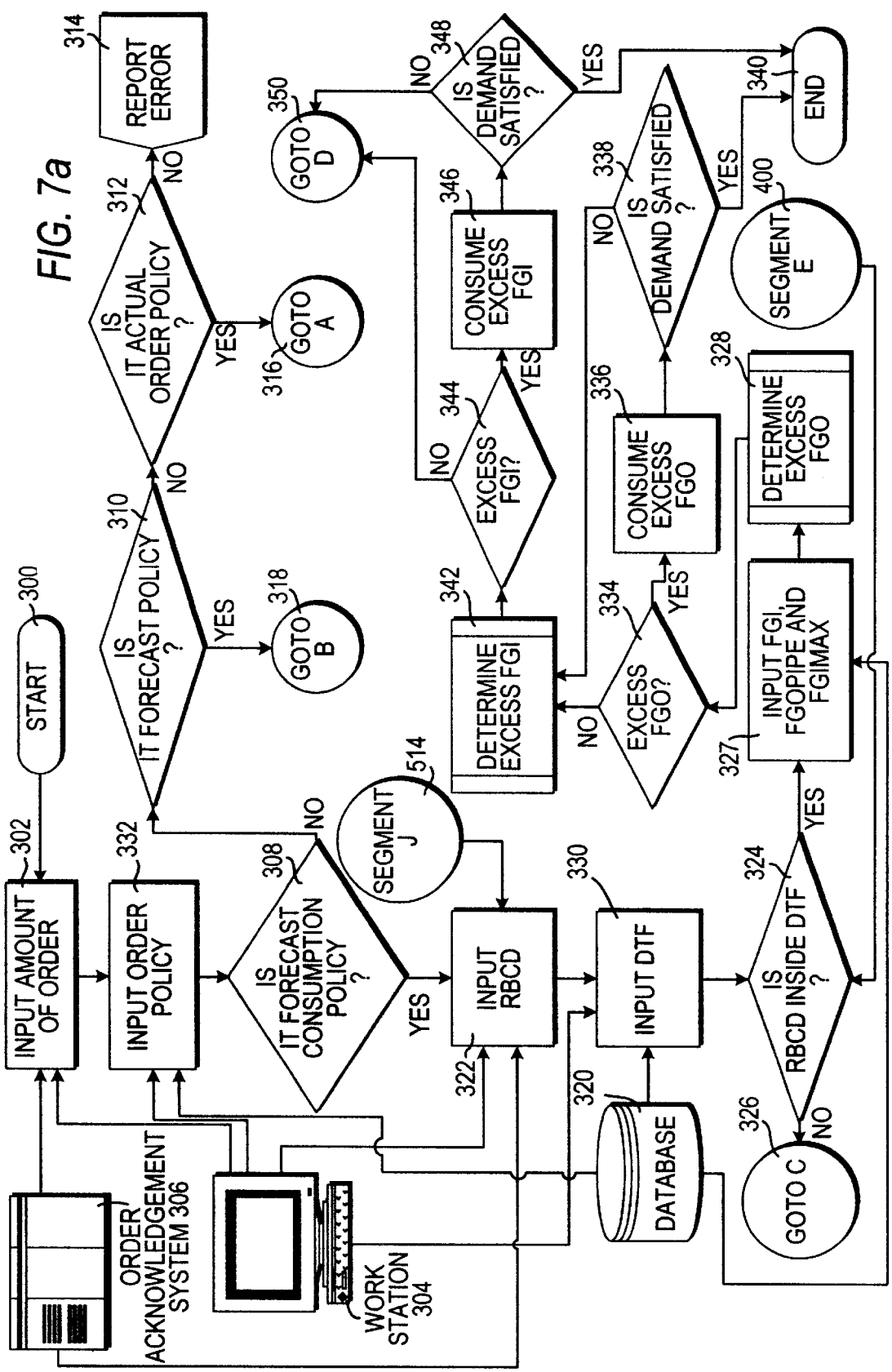
FIGS. 7a–7e depict a flowchart of the process steps of an algorithm used in accordance with an embodiment of the invention.

An example of the system and method of the invention as described, along with the above optional enhancements, will now be given. With reference to FIG. 7a, there is depicted the first part of a flowchart of the method steps of the algorithm used in accordance with an embodiment of the invention. The method begins at the start 300 when a new customer order for a product is received. The amount of a given product ordered is input at block 302 and establishes a demand for the various manufacturing resources. The product ordered in this case may be a finished goods product ordered by the customer, or it might be a subassembly which must be manufactured to be a part of a finished goods product ordered by the customer. The amount of product input at block 302 may be directly input by the user at a workstation 304, or it may be received from an order acknowledgement system 306 in the enterprise which determines the amount of several different products associated with a given customer order.

The method then retrieves the order policy for this product at a step of inputting the order policy 332. The order policy is set for each product by the user of the system and may be stored in the system database 320. Alternatively, the user can select an order policy and input it directly at workstation 304. The method then decides whether the product uses the forecast consumption policy at a decision 308. If the product does not use the forecast consumption policy, the method decides whether the product uses the forecast policy at a decision 310. If the product does not use the forecast policy, the method decides whether the product uses the actual order policy at a decision 312. If the product does not use the actual order policy, then the product uses none of the available acceptable order policies and an error is reported at a step 314. It will of course be appreciated that the method can perform decision steps 308, 310 and 312 in any order and that alternative embodiments, such as using a CASE statement may be used for deciding which order policy the product uses.

If the product does use the actual order policy, the method jumps to segment A at a transfer 316. Or, if the product uses the forecast policy, the method jumps to segment B at a transfer 318. Otherwise, if no error is reported, then the product uses the forecast consumption policy and the method transfers to a step of inputting the RBCD for the order at a block 322. The RBCD is the date at which the order for the product is entered into the system, which is generally set as the number of days greater than the amount of days in pipeline 100 that the product is promised to be ready for delivery, that is, manufactured. For example, if a customer orders a product to be delivered in 20 days, and it takes four days to manufacture the product (pipeline 100 equals four days), RBCD is set at 16 days. This date may be input by the user at workstation 304, or preferably comes from order acknowledgement system 306.

The method then retrieves the DTF for the product at a step of inputting the DTF 330. The DTF is set for each product and is stored in database 320. Alternatively, the user can determine the DTF and input it directly at workstation 304. The method than decides whether the RBCD is inside the DTF at a decision 324. If RBCD is not inside DTF, RBCD is outside DTF and the method jumps to segment C at a transfer 326. Otherwise, RBCD is inside DTF and the method next performs a step of inputting current finished goods inventory (FGI), current finished goods replenishment orders in the pipeline (FGOpipe) and the finished goods inventory maximum target (FGImax) at a block 327. The method preferably retrieves this information from database 320, and the information in database 320 is kept up-to-date by the system performing the method.

The method then determines if there is excess FGO in the pipeline that would cause FGImax to be exceeded at a procedure 328. Procedure 328 involves calculating FGI plus FGOpipe and comparing this sum to FGImax:

FGI+FGOpipe>FGImax

Again, the values for FGI and FGOpipe are preferably maintained in database 320. Alternatively, the user can input the data directly at workstation 304. The method evaluates whether there is excess FGO from procedure 328 at a decision 334. If there is, that excess FGO is consumed at a block 336 and the method determines whether the demand for the manufacturing resource to meet the customer order is satisfied at a decision 338. If the demand is satisfied, the method finishes at the end 340.

If the demand is not satisfied, or if there is no excess FGO from decision 334, the method then determines if there is excess FGI at a procedure 342. Procedure 342 involves comparing FGI to FGImax:

FGI>FGImax

The values for FGI and FGImax have been retrieved in block 327. The method evaluates whether there is excess FGI at a decision 344. If there is, that excess FGI is consumed at a block 346 and the method determines whether the demand for the manufacturing resources to meet the customer order is satisfied at a decision 348. If the demand is satisfied, the method finishes at end 340.

Figure 7B:
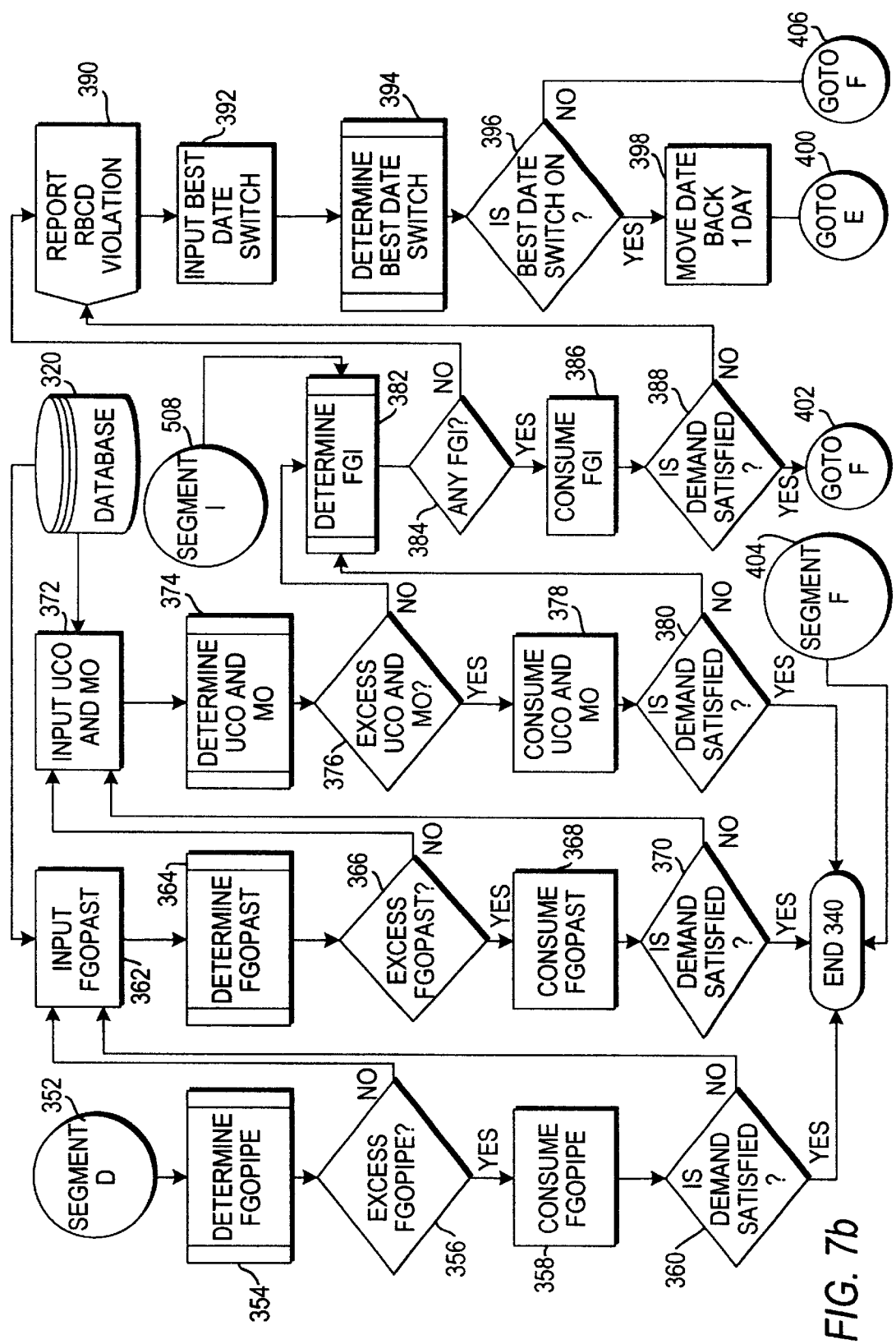

If the demand is not satisfied, or if there is no excess FGI from decision 344, the method jumps to segment D at a transfer 350. Segment D 352 is shown in FIG. 7b. The method then determines if there is remaining FGOpipe at a procedure 354. The value for FGOpipe has been retrieved in block 327. The method evaluates whether there is remaining FGOpipe from procedure 354 at a decision 356. If there is, that remaining FGOpipe is consumed at a block 358 and the method determines whether the demand for the manufacturing resource to meet the customer order is satisfied at a decision 360. If the demand is satisfied, the method finishes at end 340.

If the demand is not satisfied, or if there is no remaining FGOpipe from decision 356, the method next performs a step of inputting current past due finished goods orders (FGOpast) at a block 362. The value for FGOpast is preferably maintained in database 320. The method then determines if there is excess FGOpast at a procedure 364. The method evaluates whether there is remaining FGOpast from procedure 364 at a decision 366. If there is, that remaining FGOpast is consumed at a block 368 and the method determines whether the demand for the manufacturing resource to meet the customer order is satisfied at a decision 370. If the demand is satisfied, the method finishes at end 340.

If the demand is not satisfied, or if there is no remaining FGOpast from decision 366, the method next performs a step of inputting unallocated customer orders (uCO) and any scheduled marketing orders (MO) at a block 372. The values for uCO and MO are preferably maintained in database 320. The method then determines if there is excess uCO and MO at a procedure 374. The method evaluates whether there are uCO and MO from procedure 374 at a decision 376. If there is, those uCO and MO are consumed at a block 378 and the method determines whether the demand for the manufacturing resource to meet the customer order is satisfied at a decision 380. If the demand is satisfied, the method finishes at end 340.

If the demand is not satisfied, or if there is no uCO and MO from decision 376, the method next determines if there is remaining FGI at a procedure 382. The value for FGI has been retrieved at block 327 in FIG. 7a. The method evaluates whether there is FGI at a decision 384. If there is, that FGI is consumed at a block 386 and the method determines whether the demand for the manufacturing resource to meet the customer order is satisfied at a decision 388. If the demand is satisfied, the method jumps to segment F at transfer 402. Segment F 404 finishes at end 340.

If the demand is not satisfied, or if there is no FGI from decision 384, the method generates a RBCD violation 390 that the demand for manufacturing resources to meet the customer order cannot be satisfied. The system and method of the invention has the ability to determine on what date manufacturing resources to meet the demand created by the customer order will be available, and therefore what date (i.e., the best date) the customer order can be filled. In this case, each product record has a best date switch, which when turned on, tells the system and method of the invention to determine the first date on which the customer order can be filled.

The method retrieves the status of the best date switch at an input best date switch block 392, and determines the state of the switch at a procedure 394. The method evaluates whether best date switch is on at a decision 396, and if it is not, the method jumps to segment F at transfer 406 and segment F 404 finishes at end 340. If the best date switch is on at decision 396, the method moves RBCD back one day at a block 398. Block 398 increments RBCD by one day. The method then jumps to segment E at a transfer 400. Segment E is shown in FIG. 7a and transfers control of the method back to decision 324 to determine if RBCD is inside DTF.

Figure 7C:
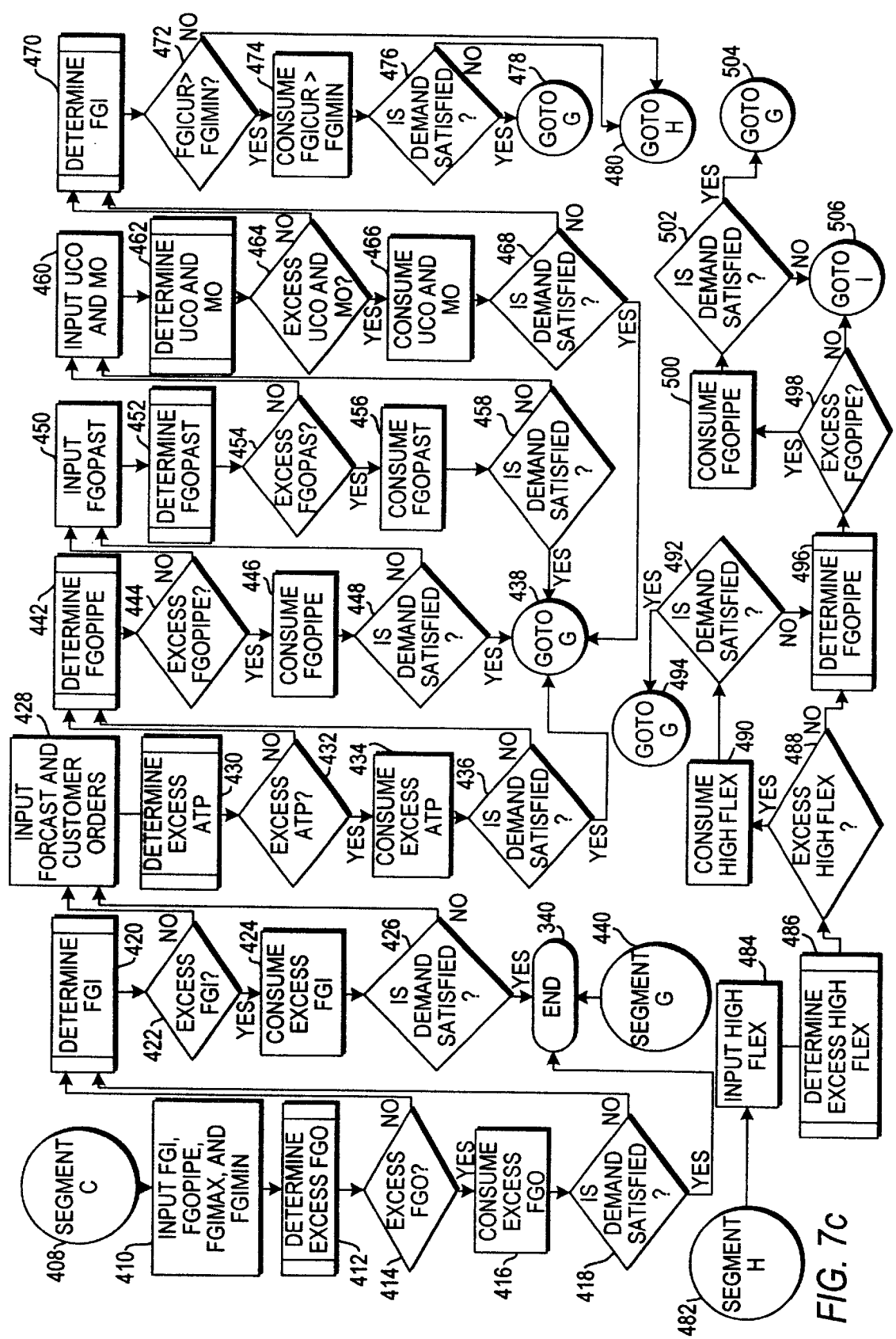

In the case where RBCD is not inside DTF, the method jumps from transfer 326 to a segment C 408 in FIG. 7c. The method next performs a step of inputting FGI, FGOpipe, FGImax and a finished goods inventory minimum target (FGImin) at a block 410. The method preferably retrieves this information from database 320.

The method then determines if there is excess FGO in the pipeline that would cause FGImax to be exceeded at a procedure 412. Procedure 412 involves calculating FGI plus FGOpipe and comparing this sum to FGImax:

FGI+FGOpipe>FGImax

The method evaluates whether there is excess FGO from procedure 412 at a decision 414. If there is, that excess FGO is consumed at a block 416 and the method determines whether the demand for the manufacturing resource to meet the customer order is satisfied at a decision 418. If the demand is satisfied, the method finishes at end 340.

If the demand is not satisfied, or if there is no excess FGO from decision 414, the method then determines if there is excess FGI at a procedure 420. Procedure 420 involves comparing FGI to FGImax:

FGI>FGImax

The values for FGI and FGImax have been retrieved in block 410. The method evaluates whether there is excess FGI at a decision 422. If there is, that excess FGI is consumed at a block 424 and the method determines whether the demand for the manufacturing resources to meet the customer order is satisfied at a decision 426. If the demand is satisfied, the method finishes at end 340.

If the demand is not satisfied, or if there is no excess FGI from decision 422, the method next performs a step of inputting forecasted amount and customer orders at a block 428. The method preferably retrieves this information from database 320.

The method then determines if there is excess ATP at a procedure 430. Procedure 430 involves calculating forecasted amount minus customer orders:

Forecasted Amount—Customer Orders

The method evaluates whether there is excess ATP from procedure 430 at a decision 432. If there is, that excess ATP is consumed at a block 434 and the method determines whether the demand for the manufacturing resource to meet the customer order is satisfied at a decision 436. If the demand is satisfied, the method jumps to segment G at a transfer 438 and segment G 440 finishes at end 340.

If the demand is not satisfied, or if there is no excess ATP from decision 432, the method then determines if there is excess FGOpipe at a procedure 442. The value for FGOpipe has been retrieved in block 410. The method evaluates whether there is remaining FGOpipe from procedure 442 at a decision 444. If there is, that remaining FGOpipe is consumed at a block 446 and the method determines whether the demand for the manufacturing resources to meet the customer order is satisfied at a decision 448. If the demand is satisfied, the method jumps to segment G at a transfer 438 and segment G 440 finishes at end 340.

If the demand is not satisfied, or if there is no remaining FGOpipe from decision 444, the method next performs a step of inputting FGOpast at a block 450. The value for FGOpast is preferably maintained in database 320 (not shown). The method then determines if there is excess FGOpast at a procedure 452. The method evaluates whether there is remaining FGOpast from procedure 452 at a decision 454. If there is, that remaining FGOpast is consumed at a block 456 and the method determines whether the demand for the manufacturing resource to meet the customer order is satisfied at a decision 458. If the demand is satisfied, the method jumps to segment G at a transfer 438 and segment G 440 finishes at end 340.

If the demand is not satisfied, or if there is no remaining FGOpast from decision 454, the method next performs a step of inputting uCO and MO at a block 460. The values for uCO and MO are preferably maintained in database 320 (not shown). The method then determines if there is excess uCO and MO at a procedure 462. The method evaluates whether there are uCO and MO from procedure 462 at a decision 464. If there is, those uCO and MO are consumed at a block 466 and the method determines whether the demand for the manufacturing resources to meet the customer order is satisfied at a decision 468. If the demand is satisfied, the method jumps to segment G at a transfer 438 and segment G 440 finishes at end 340.

If the demand is not satisfied, or if there is no uCO and MO from decision 464, the method next determines if there is remaining FGI greater than FGImin at a procedure 470. The values for FGI and FGImin have been retrieved at block 410. The method evaluates whether there is FGI greater than FGImin at a decision 472. If there is, that FGI greater than FGImin is consumed at a block 474 and the method determines whether the demand for the manufacturing resources to meet the customer order is satisfied at a decision 476. If the demand is satisfied, the method jumps to segment G at a transfer 478 and Segment G 440 finishes at end 340.

If the demand is not satisfied, or if there is no FGI greater than FGImin from decision 472, the method jumps to segment H at a transfer 480 and Segment H 482 transfers to a step of inputting High Flex at a block 484. The value for High Flex is preferably maintained in database 320 (not shown) or may be input by the user at workstation 340 (not shown). The method then determines if there is excess High Flex at a procedure 486. The method evaluates whether there is High Flex from procedure 486 at a decision 488. If there is, that remaining High Flex is consumed at a block 490 and the method determines whether the demand for the manufacturing resources to meet the customer order is satisfied at a decision 492. If the demand is satisfied, the method jumps to segment G at a transfer 494 and segment G 440 finishes at end 340.

If the demand is not satisfied, or if there is no High Flex from decision 488, the method next performs a step of determining if there is remaining FGOpipe at a procedure 496. The value for FGOpipe has been retrieved in block 410. The method evaluates whether there is remaining FGOpipe from procedure 496 at a decision 498. If there is, that remaining FGOpipe is consumed at a block 500 and the method determines whether the demand for the manufacturing resources to meet the customer order is satisfied at a decision 502. If the demand is satisfied, the method jumps to segment G at a transfer 504 and segment G 440 finishes at end 340.

If the demand is not satisfied, or if there is no FGOpipe from decision 498, the method jumps to segment I at transfer 506. Segment I 508, shown on FIG. 7b, transfers control back to the step of determining remaining FGI at procedure 382 and continues from there.

Figure 7E:
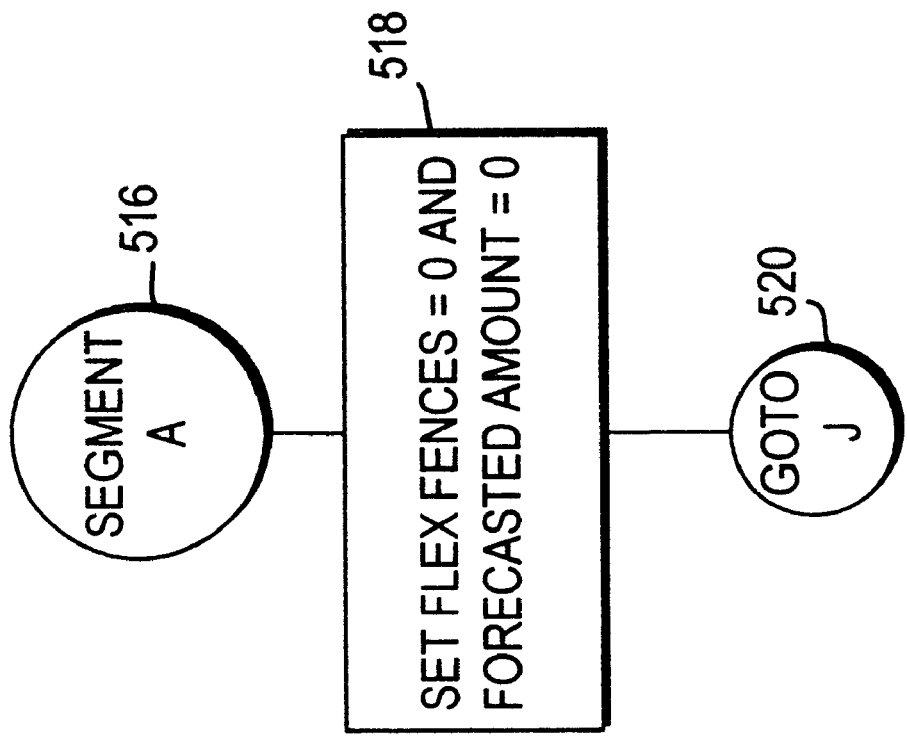
Figure 7D:
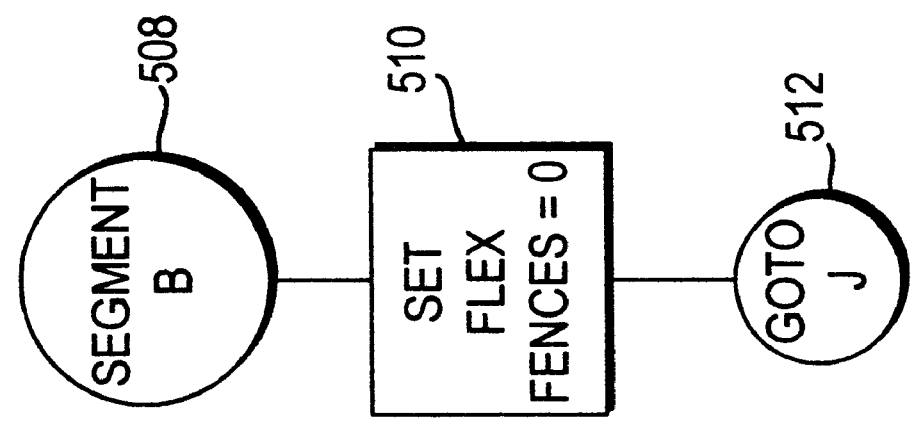

In the case where the order policy from block 332 in FIG. 7a is forecast policy, the method jumps to Segment B 508 in FIG. 7d from transfer 318 in FIG. 7a. The method then sets flex fences equal to 0 at a block 510 and then transfers to Segment J 514, in FIG. 7a, from a transfer 512 in FIG. 7d. Segment J 514 transfers control back to the step of inputting RBCD at block 322 and continues from there.

In the case where the order policy from block 332 in FIG. 7a is actual order policy, the method jumps to Segment A 516 in FIG. 7e from transfer 316 in FIG. 7a. The method then sets flex fences equal to 0 and forecasted amount equal to zero at a block 518 and then transfers to Segment J 514, in FIG. 7a, from a transfer 520 in FIG. 7e. Segment J 514 transfers control back to the step of inputting RBCD at block 322 and continues from there.

Of course, it should be noted that the precise order in which demand for manufacturing resources is consumed may be altered without deviating from the scope of the present invention. For example, in the manufacturing or producing of goods that do not have a substantial shelf life, or are otherwise perishable, any finished goods inventory above the finished goods inventory minimum target would desirably be consumed prior to finished goods replenishment orders in the pipeline. With reference to FIG. 3, step 37 would be performed directly after step 32 and before step 34. This would have the effect of biasing the system and method of the invention towards maintaining the finished goods inventory minimum target. Therefore, the perishable goods would not tend to remain on the inventory shelves.

Additionally it should be noted that in the case where particular parts belong to an ATP Family, the method may be modified at procedure 430 in FIG. 7c to consume ATP from other parts in the ATP family after consuming any excess ATP (if any) at block 434 and before procedure 442. Furthermore, the method is modified at procedure 486 in FIG. 7c to consume shared available high flex from other parts the ATP family after consuming any excess high Flex (if any) at block 490 and before procedure 496.

Because the system and method of the invention determines the compound daily rate as a mathematical average over several days, and includes future forecast and past historical components, dramatic fluctuations up and down of the actual daily rate, are dampened and artificially noisy daily rates may be eliminated. Flex capacity is changed only with some momentum of demand trends, historical patterns, or forecasted changes. Additional flex capacity is made available only with some momentum of demand trends, historical patterns, or forecasted changes. Therefore, suppliers see less volatility that is not part of an actual demand trend and the system provides more predictability that is reliably reflective of the direction of actual demand. The materials planner can decide which is more important by adjusting the weights of the components, the average of the pipeline rate, forecasted amounts, or historical data. Furthermore, this view of timeframe can be set different from month to month.

Figure 8B:
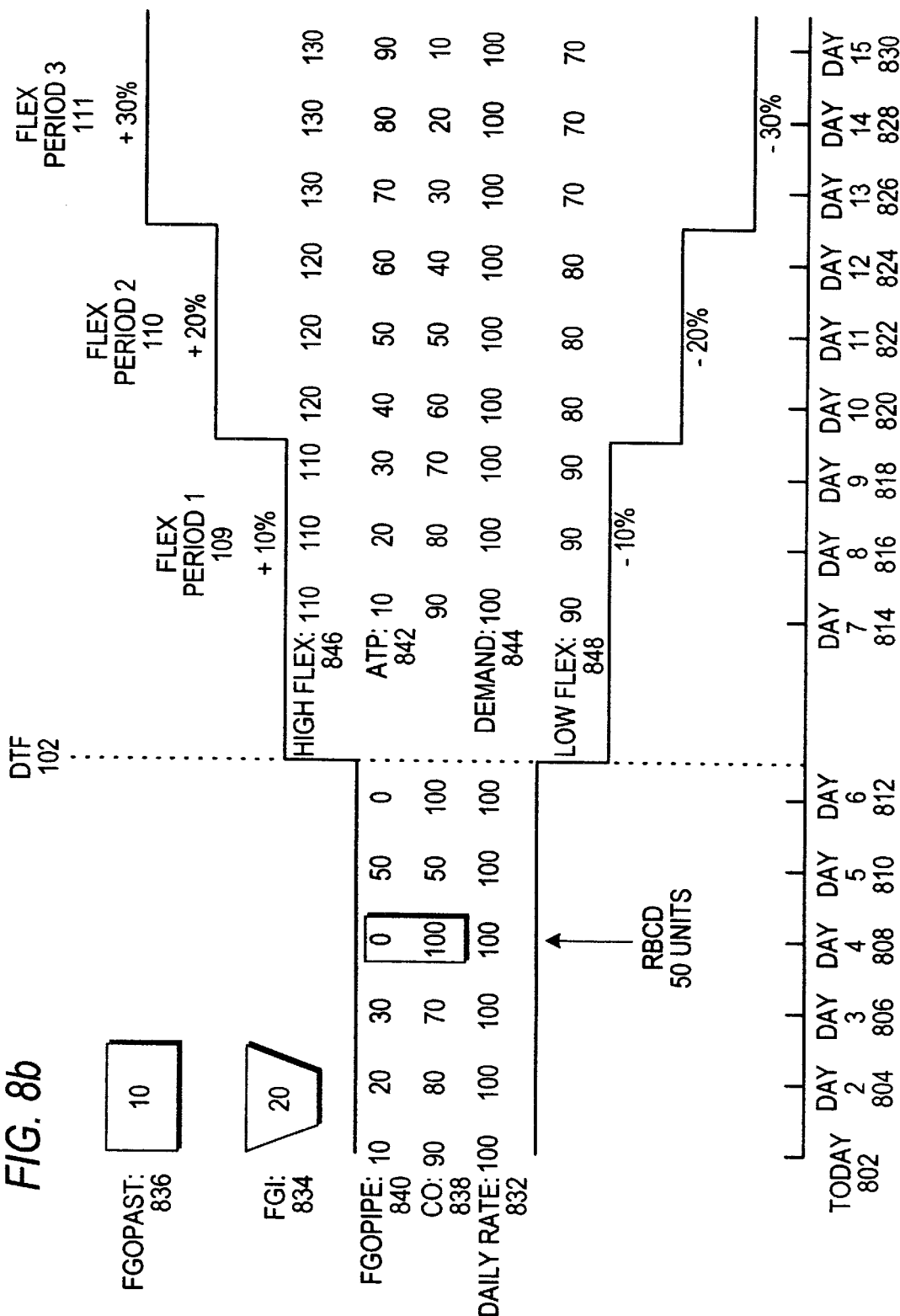
FIGS. 8a–8v depict spreadsheets useful for following the results of an algorithm in accordance with the invention as applied to an example of unanticipated customer orders for a product coming in to a manufacturer.
Figure 8C:
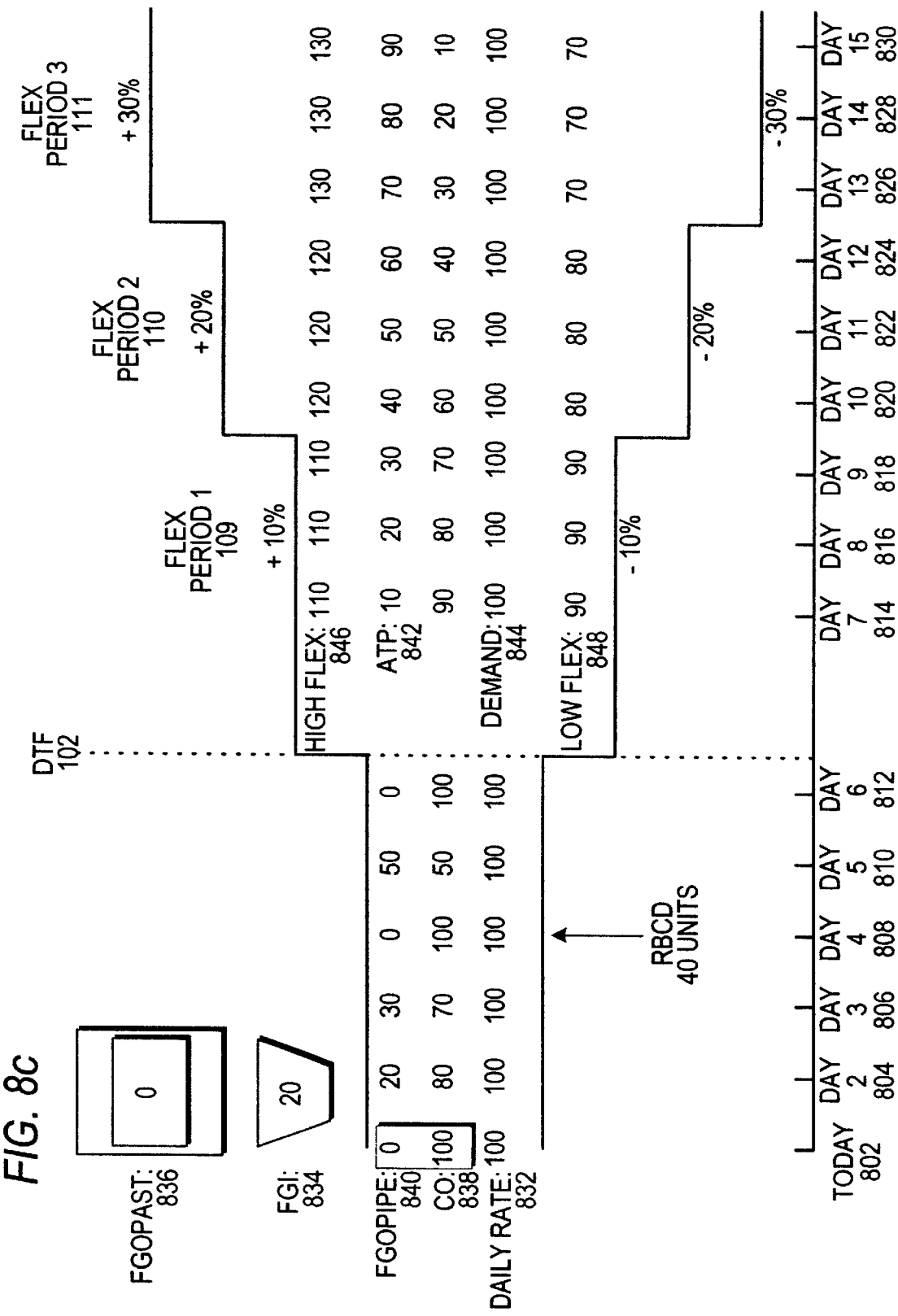
Figure 8D:
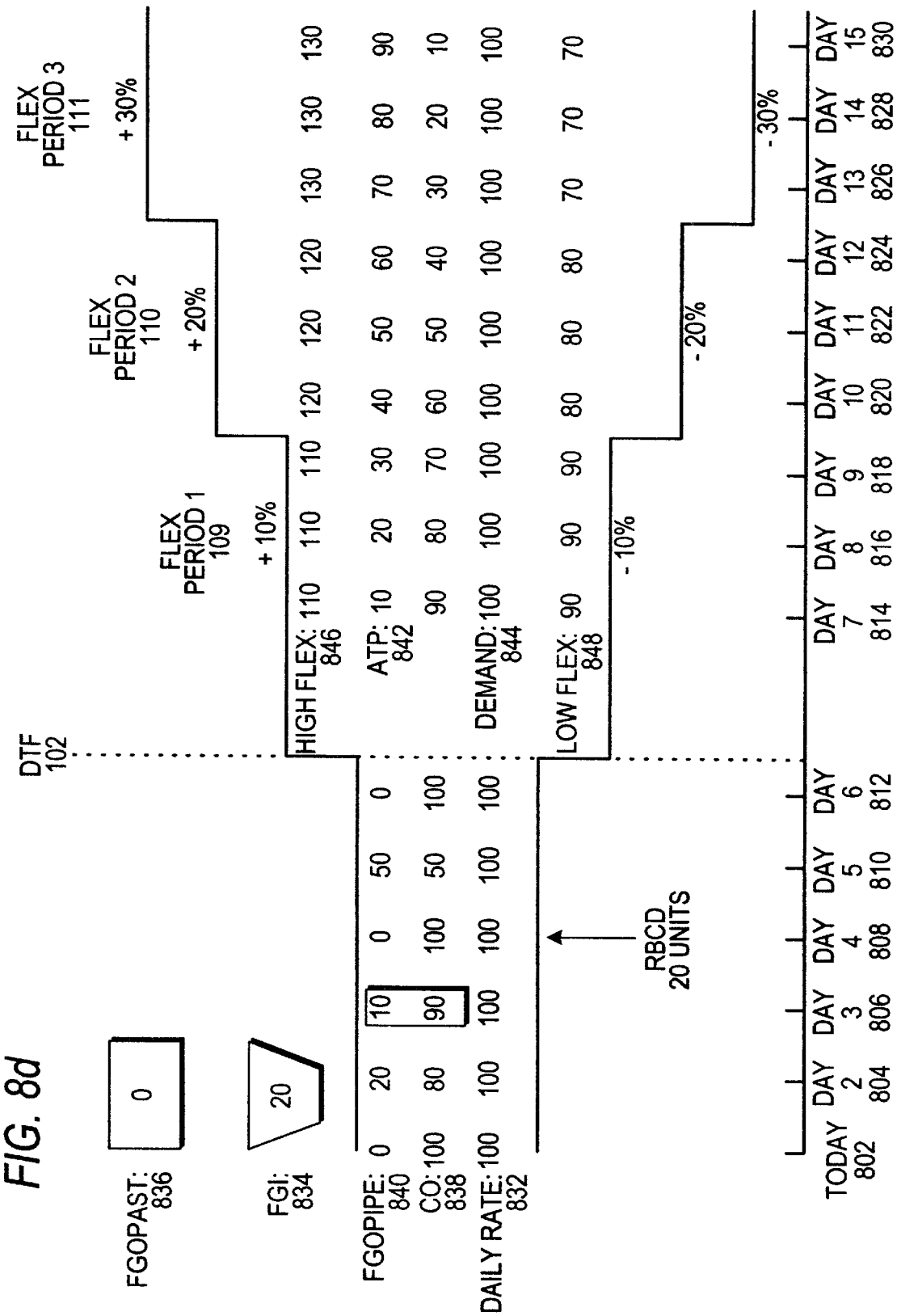
Figure 8E:
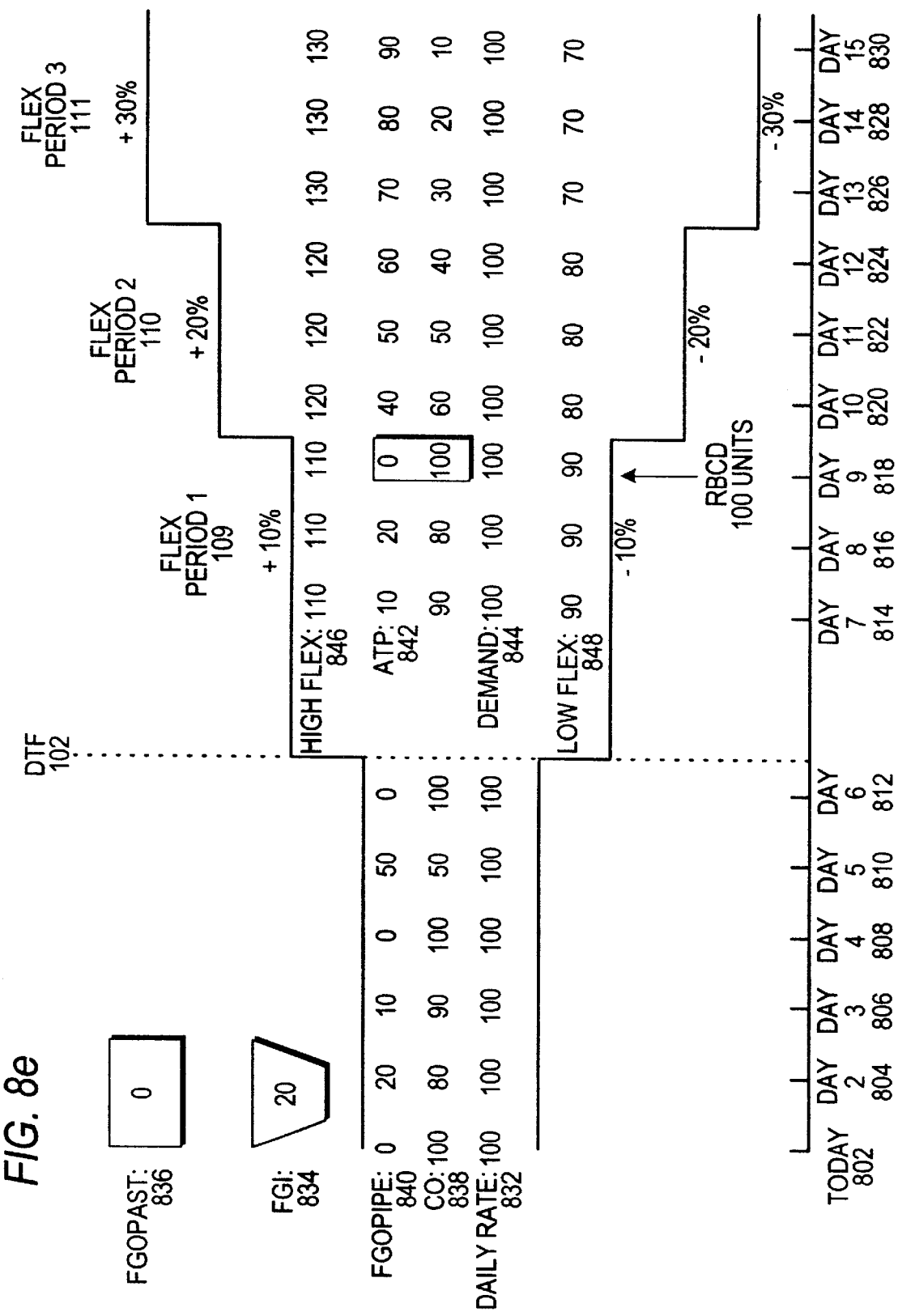
Figure 8F:
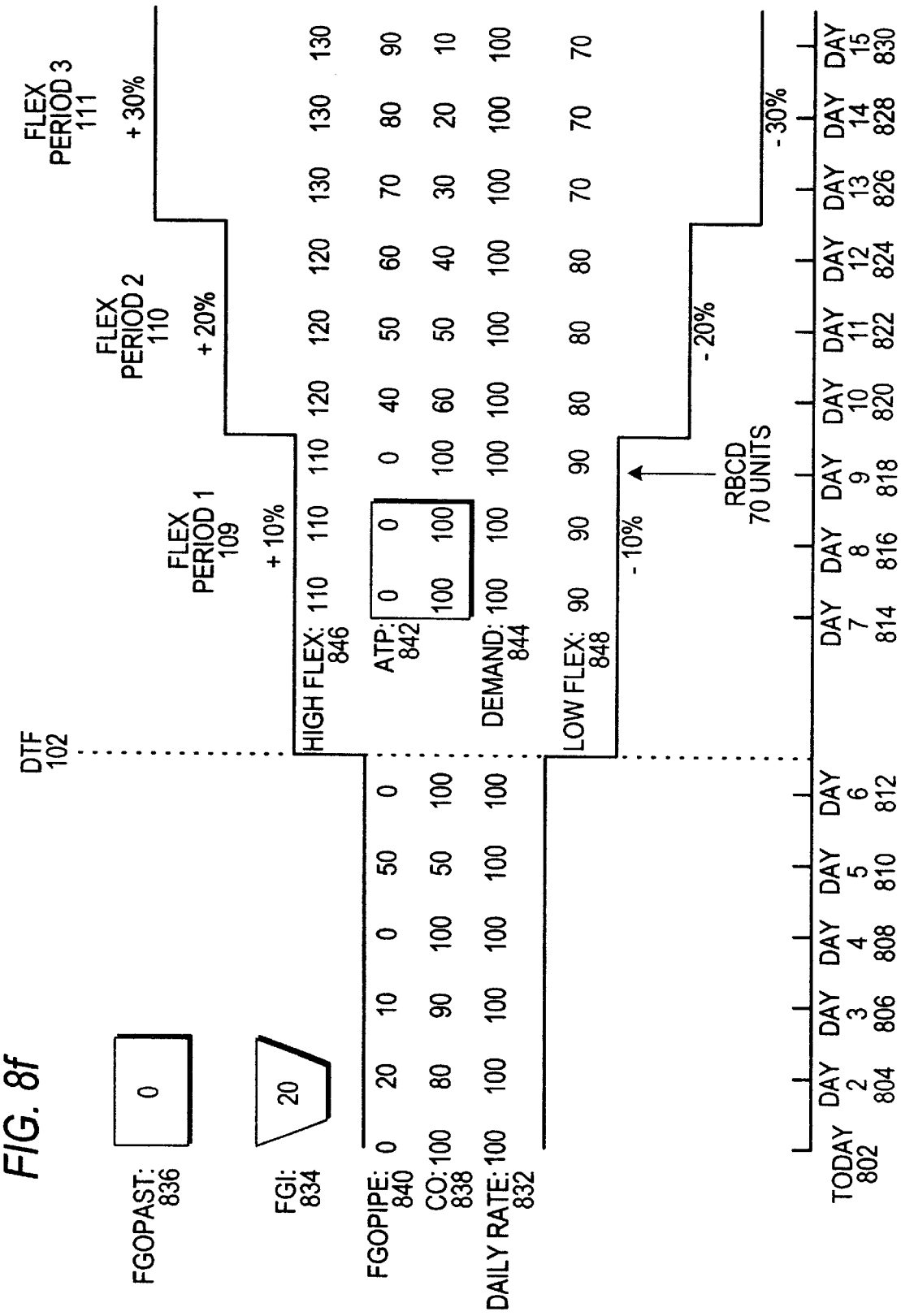
Figure 8G:
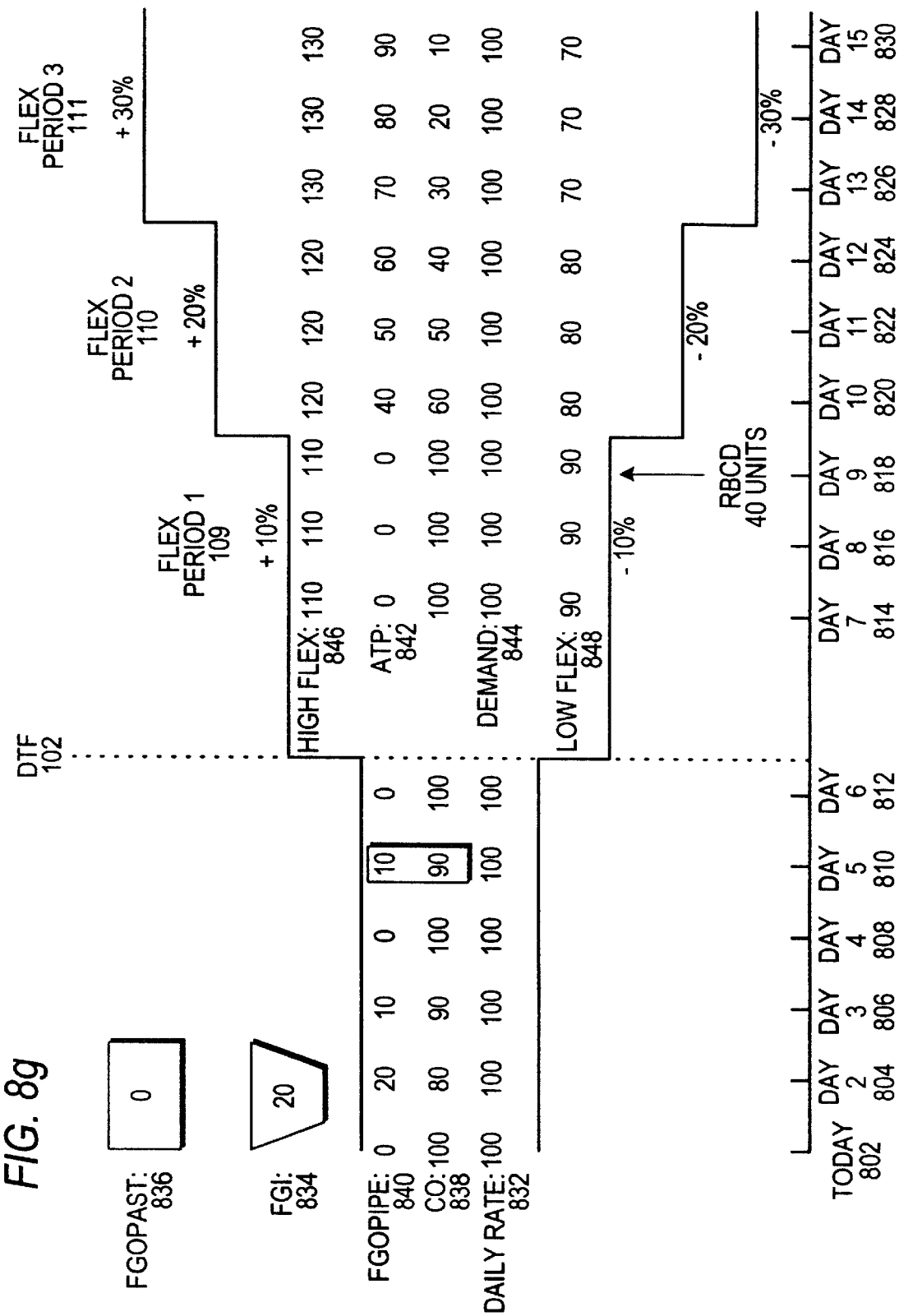
Figure 8H:
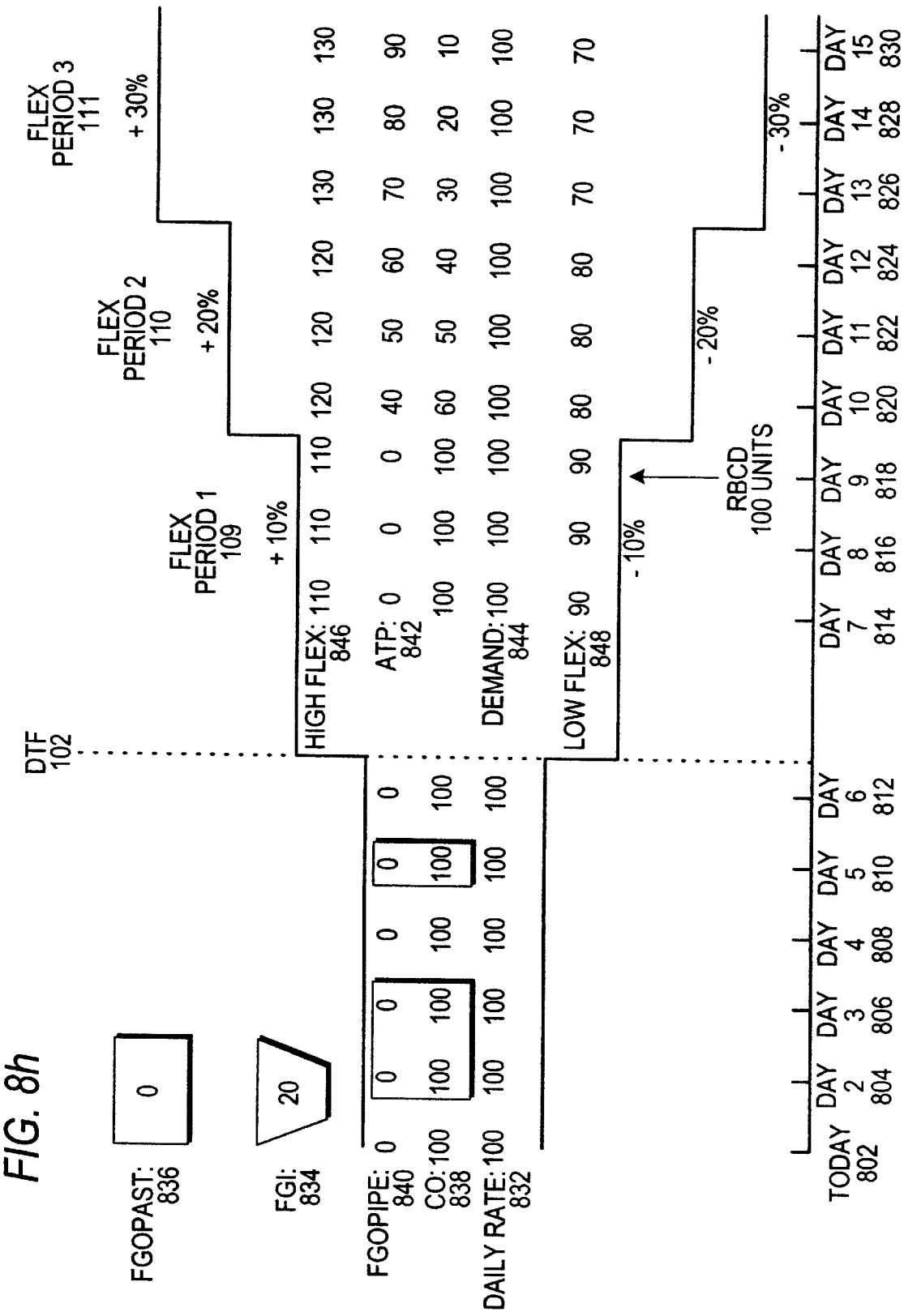
Figure 8I:
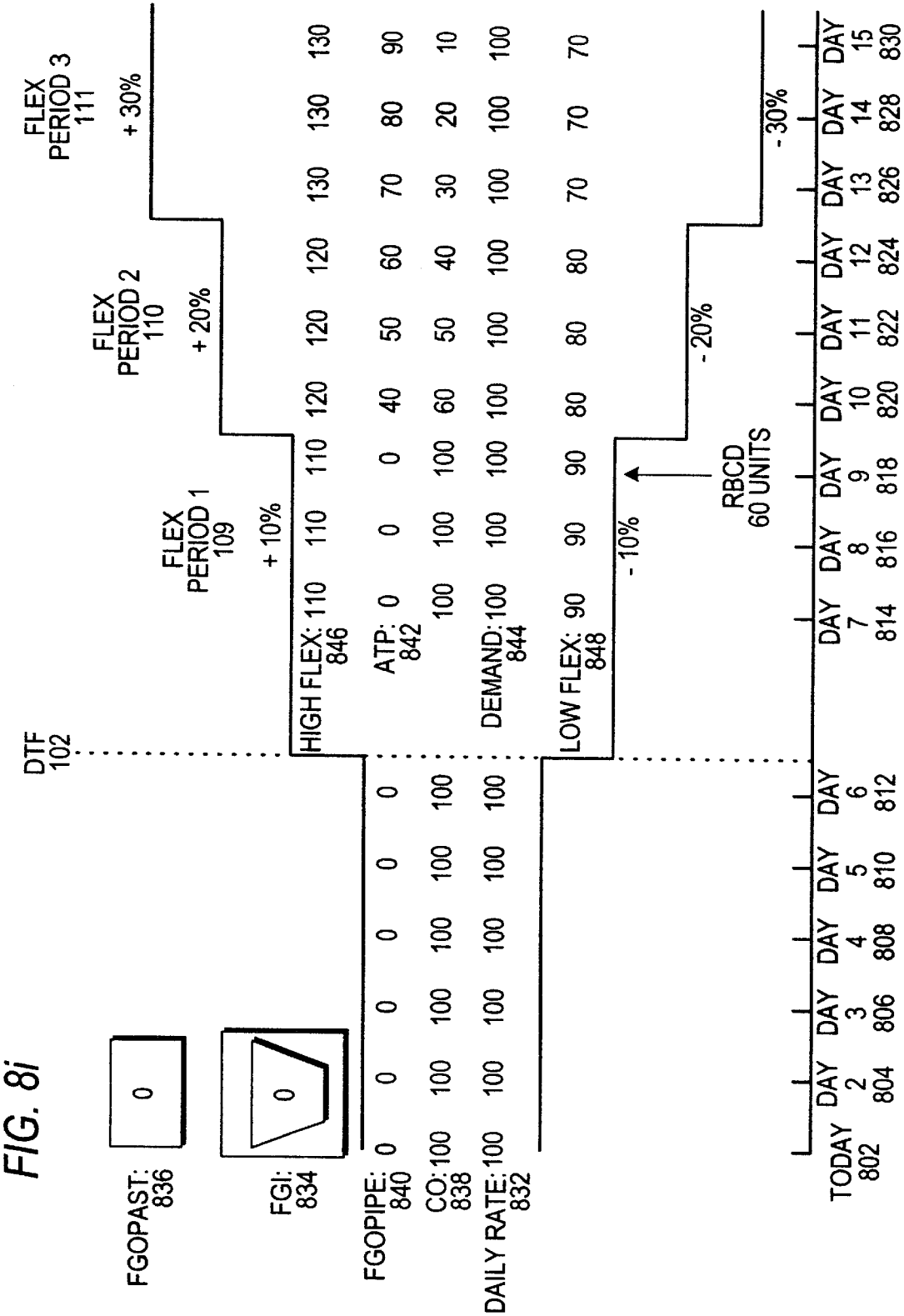
Figure 8J:
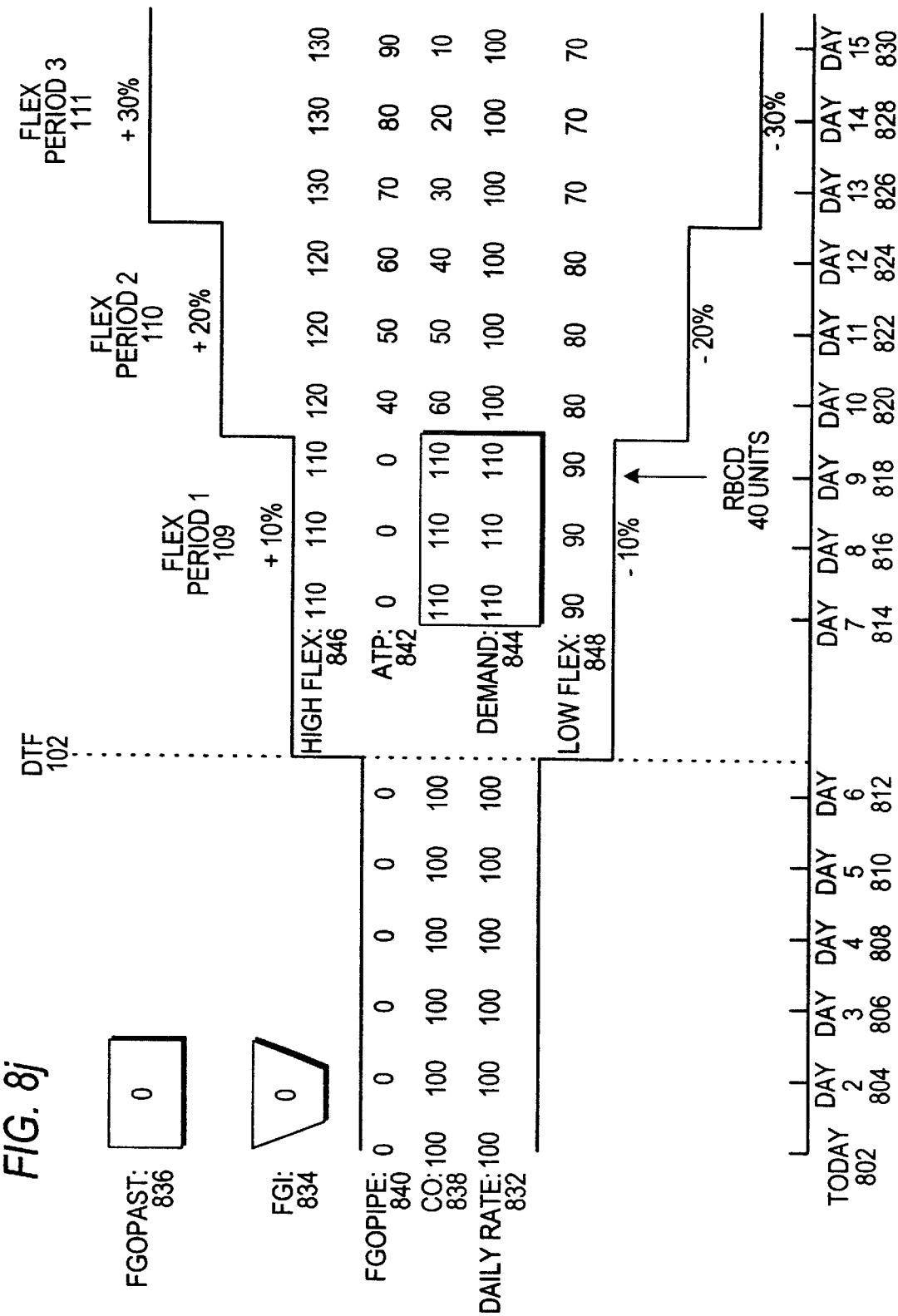
Figure 8K:
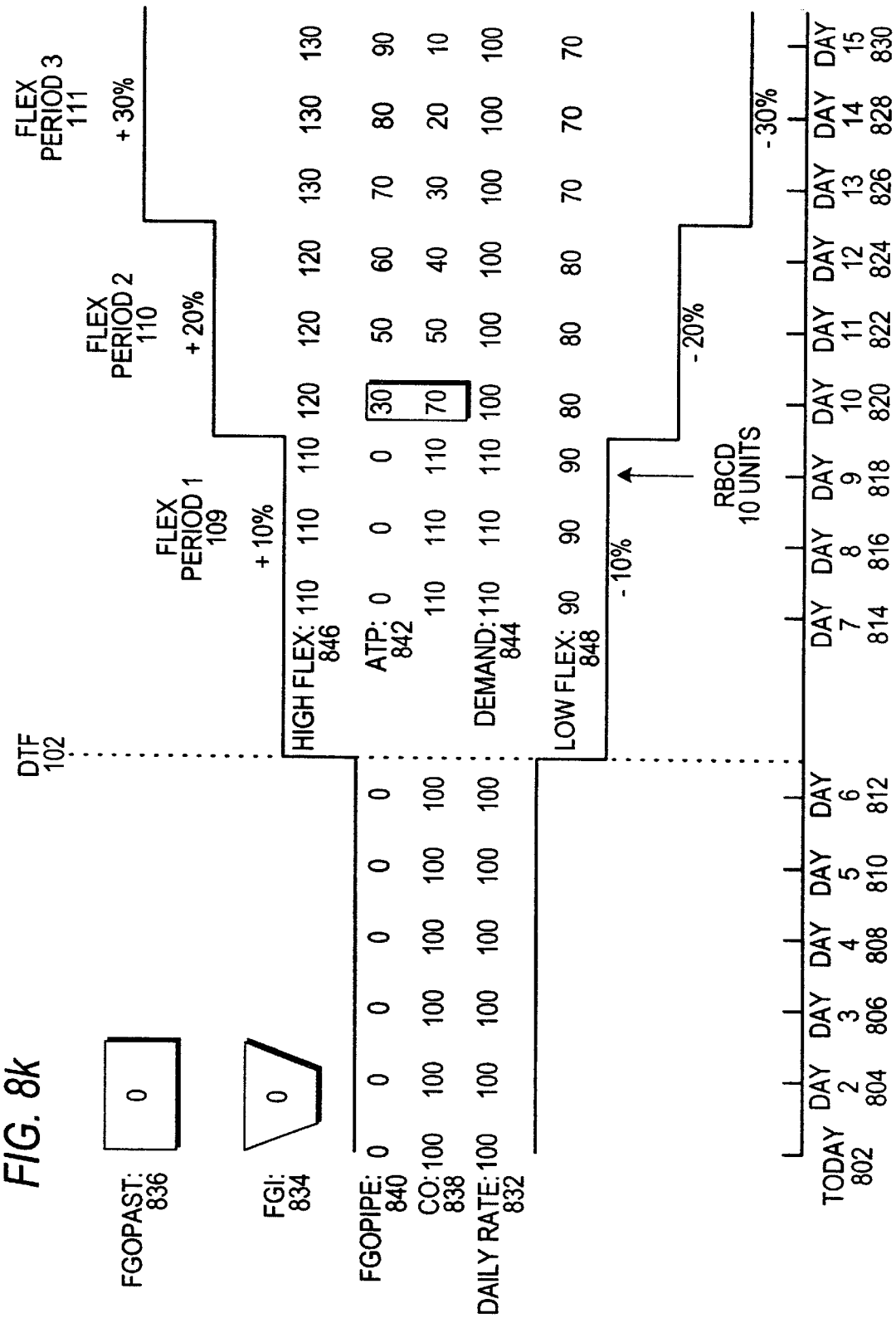
Figure 8I:
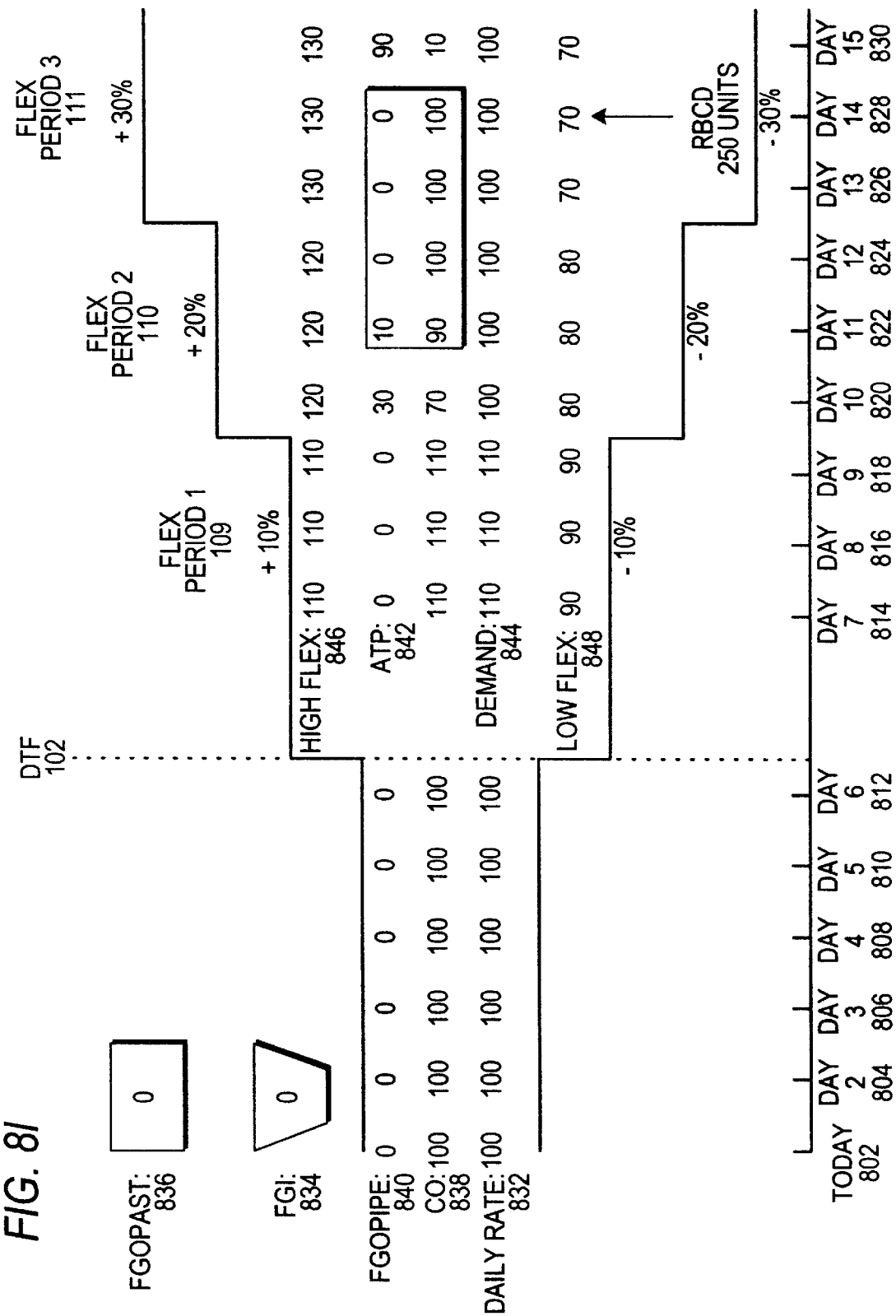
Figure 8M:
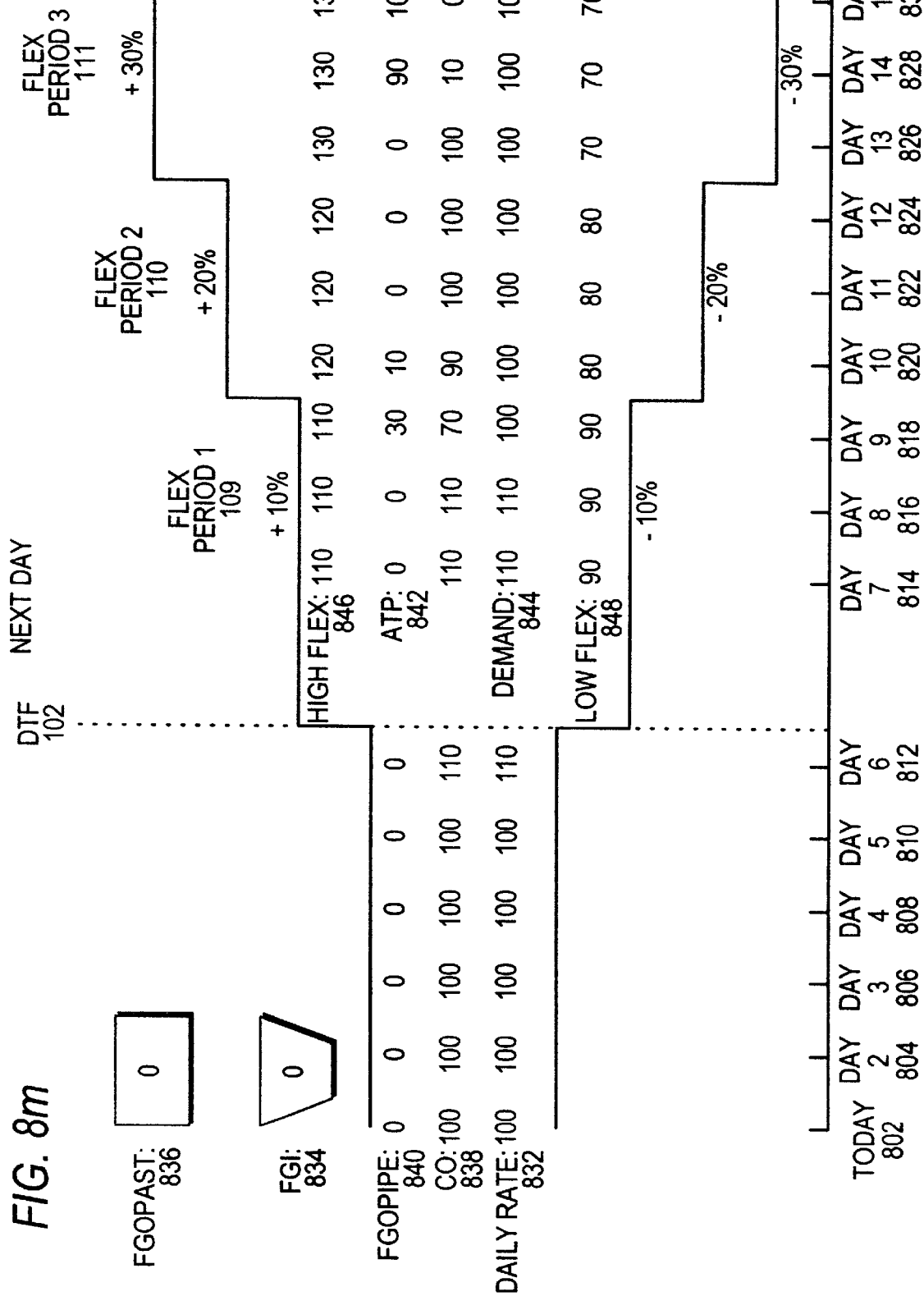
Figure 8N:
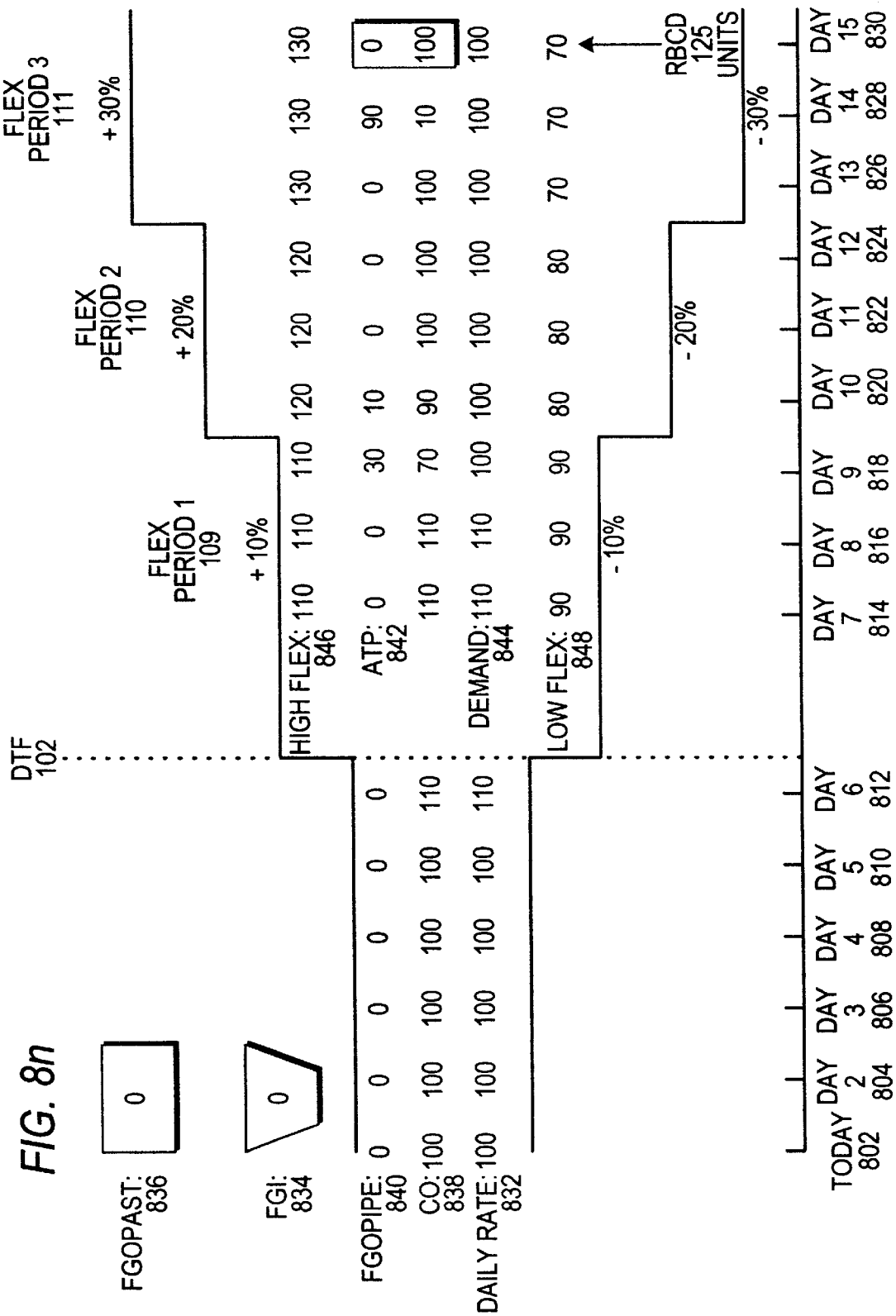
Figure 80:
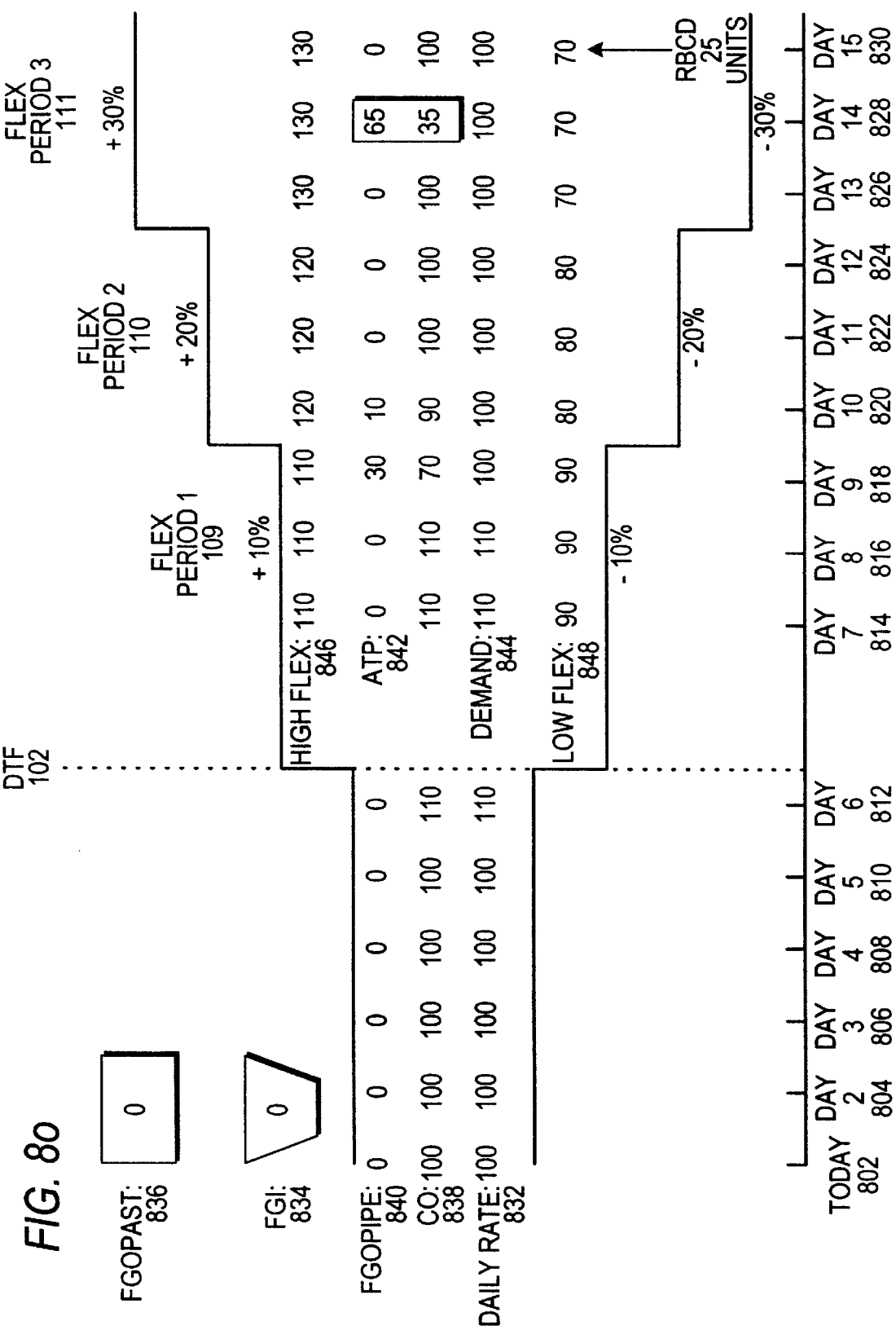
Figure 8P:
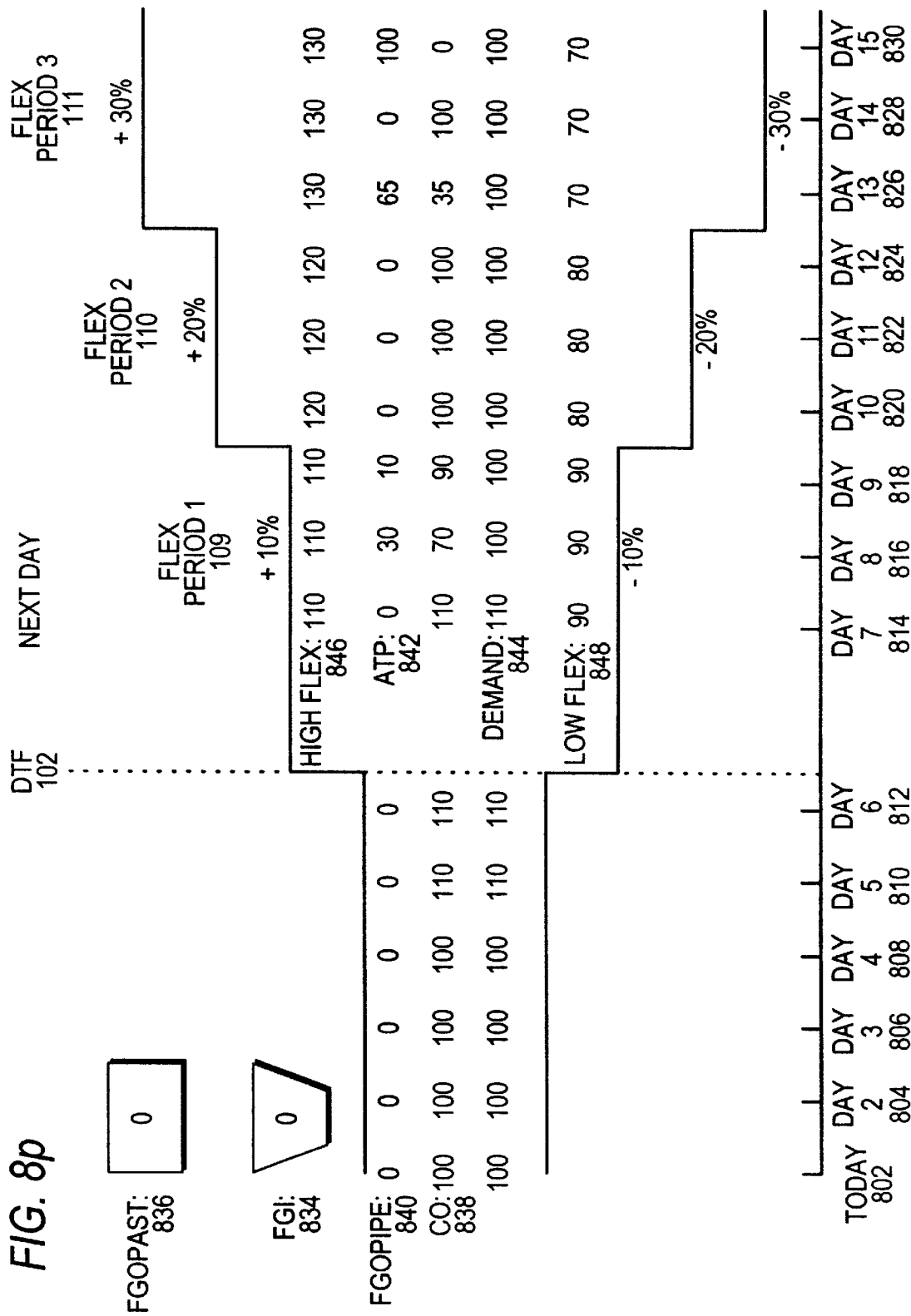
Figure 8Q:
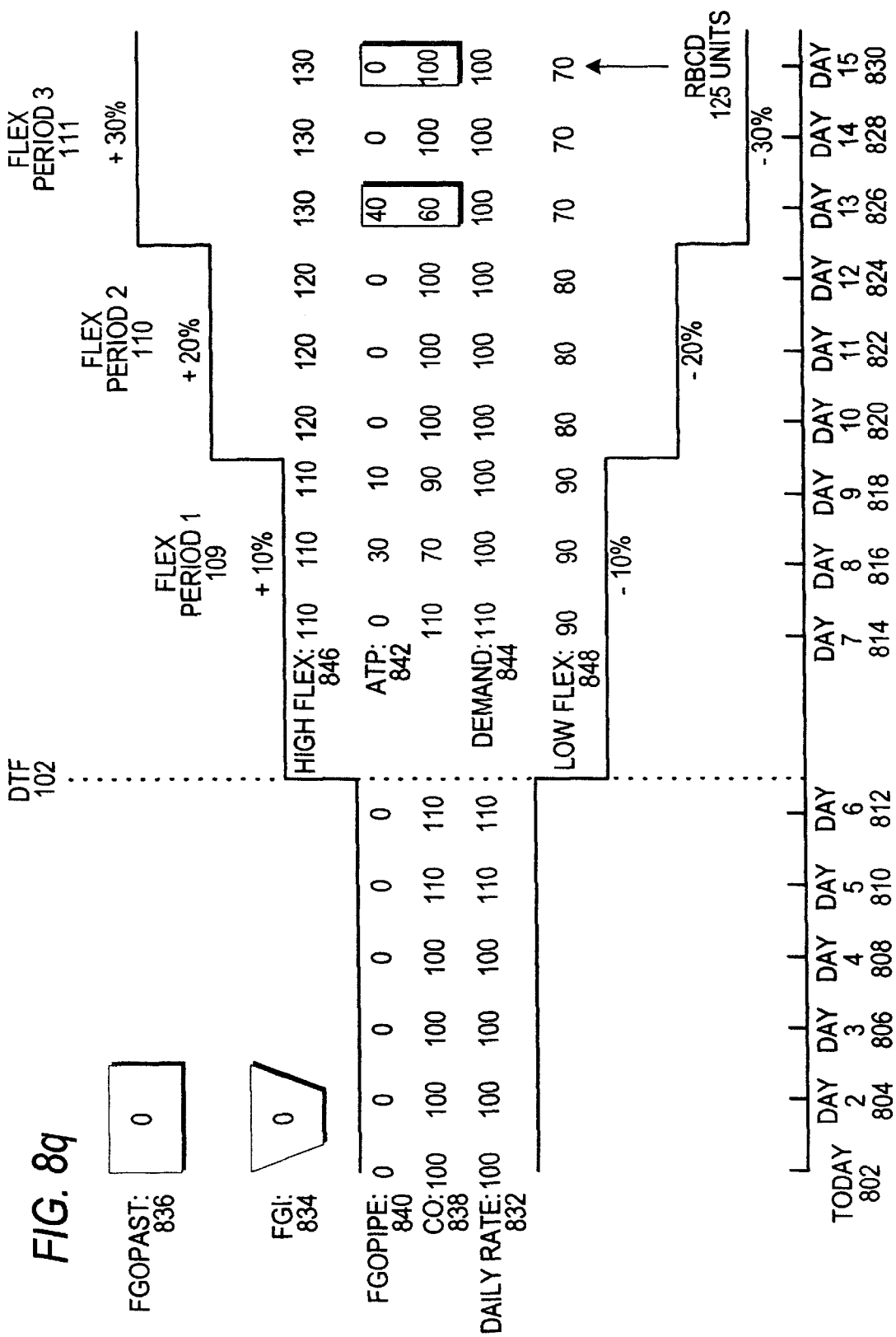
Figure 8S:
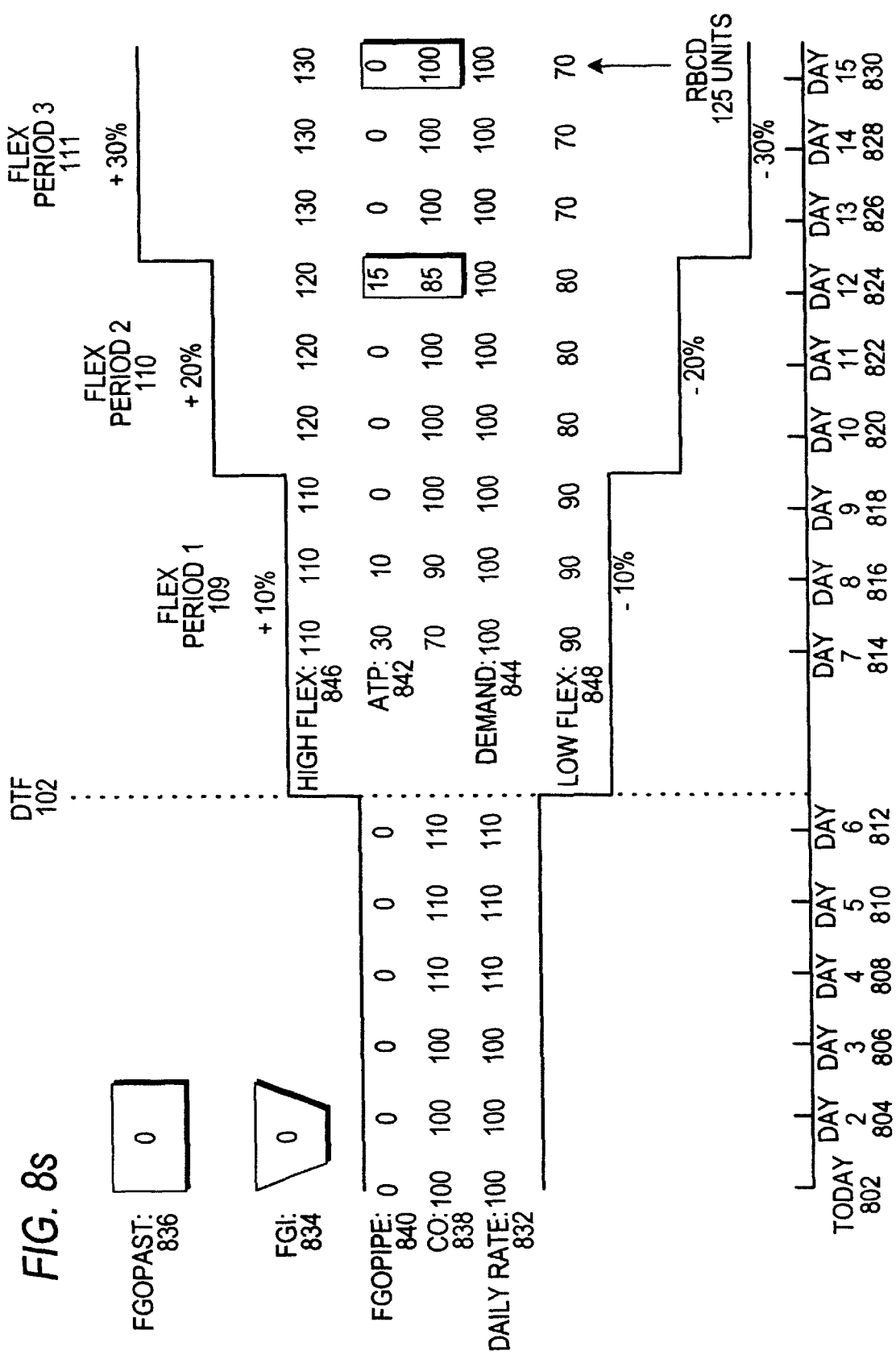
Figure 8T:
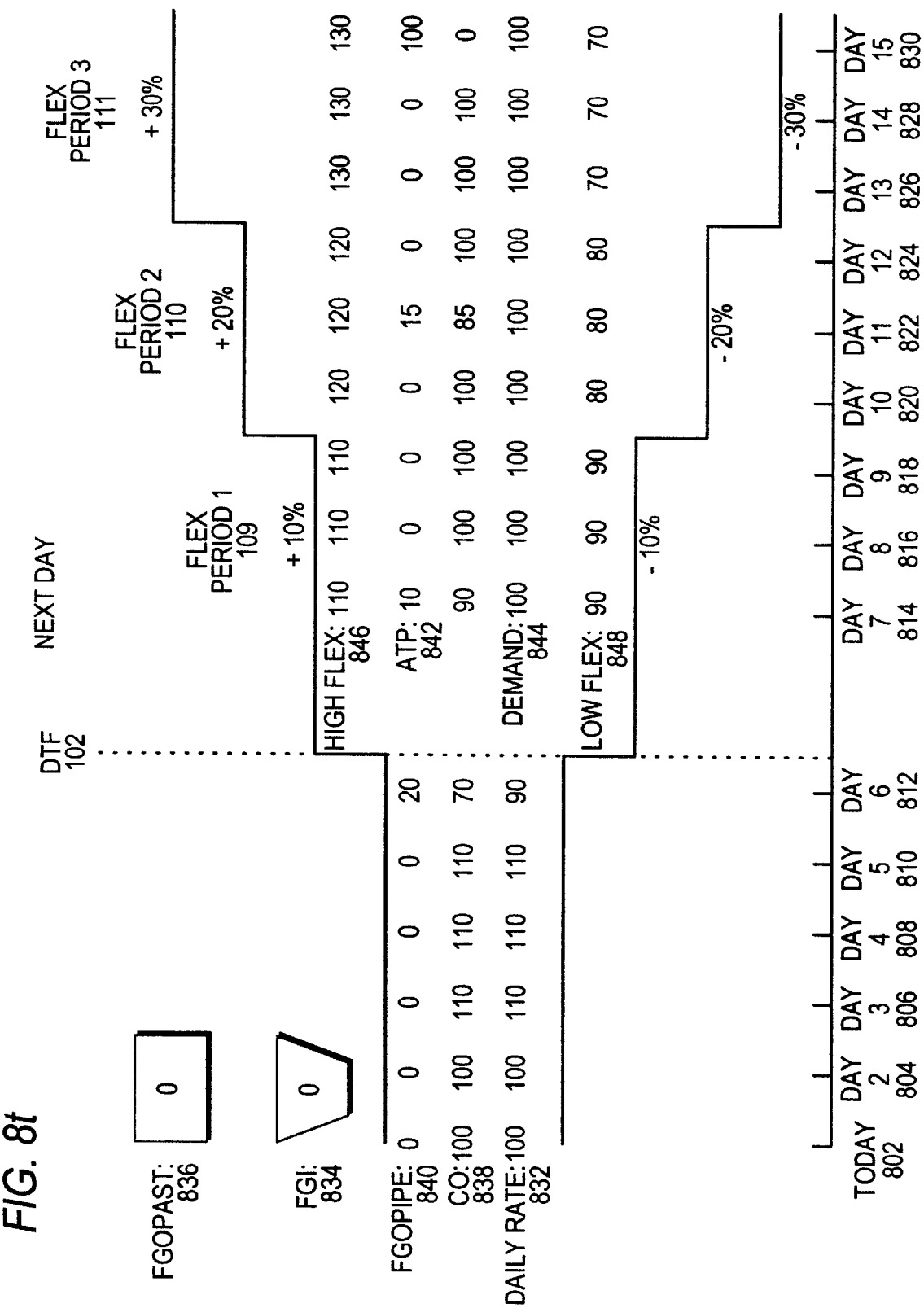
Figure 8V:
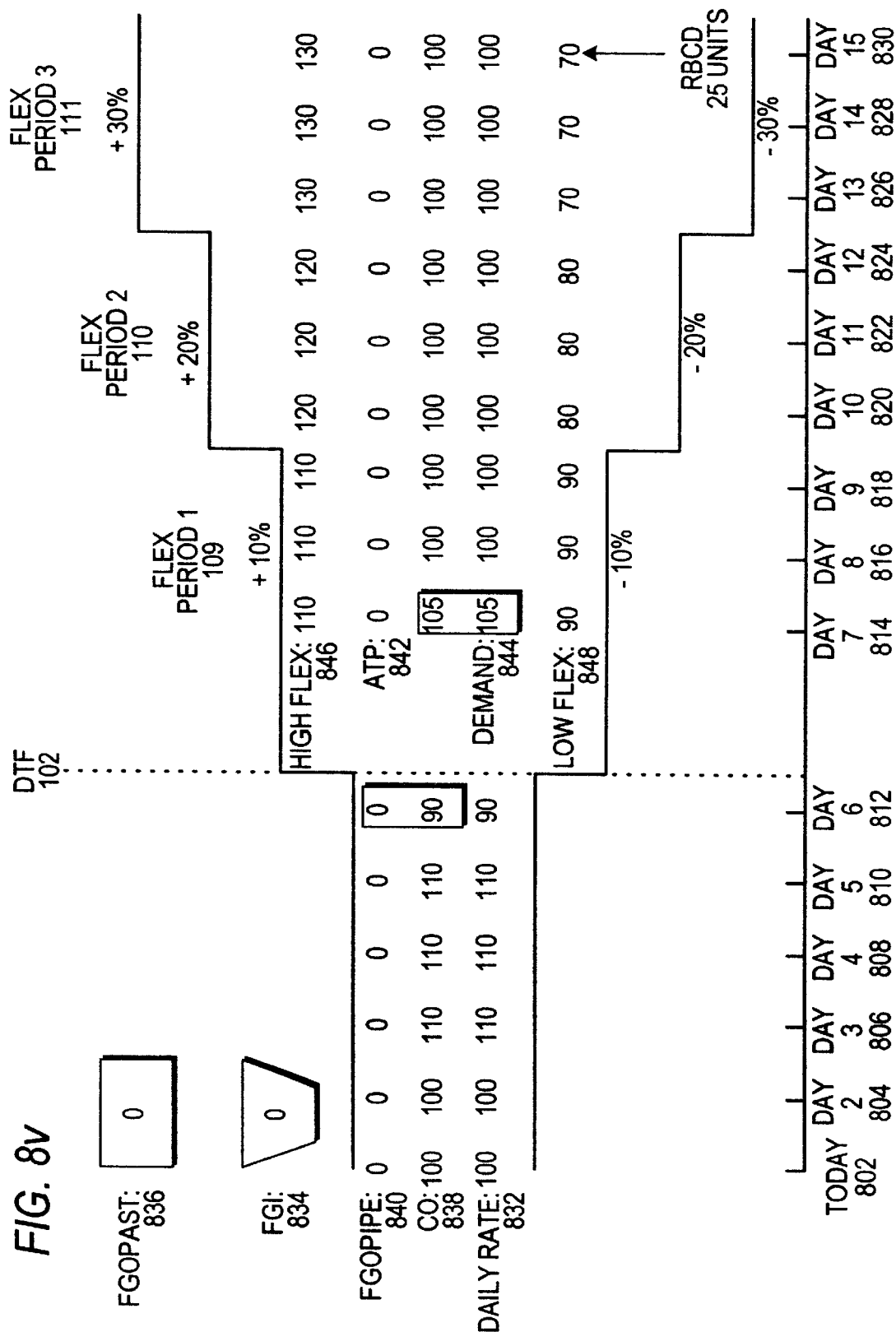

With reference to FIGS. 8a through 8v, an example of the results of an algorithm in accordance with an embodiment of the invention applied to unanticipated customer orders is shown. FIG. 8a depicts the current situation, today, prior to receiving additional customer orders for a product.

As shown in this example, the manufacturing lead time is six days, and there are three flex periods of three days each having flex amounts of 10%, 20% and 30%, respectively. There are 20 units of the product in finished goods inventory, FGI 834, and 10 units of past due finished goods orders, FGOpast 836. The daily rate 832 for today 802 is 100. That is, 100 units of the product will be produced today. Of those 100 units, 90 are allocated to customer orders 838 and the other 10 units are current finished goods replenishment orders in the pipeline, FGOpipe 840.

The forecast for the entire period shown (15 days) is 100 units of product per day. Actual customer orders 838 for the product are shown for each day in the plan. In this example, actual customer orders are below the forecast amount, and therefore daily rate 832 in the pipeline is set at the forecast amount of 100. On days in which customer orders exceed the forecast amount, daily rate 832 would be set to the amount of customer orders.

The demand currently planned for, demand 844, in the flex periods, is also set at the greater of actual customer orders 838 and the forecast amount. The available to promise amount, ATP 842 is the difference between demand 844 and actual customer orders 838.

Finished goods replenishment orders produced that are not allocated to a customer order will be allocated to finished goods inventory unless used to meet a new customer order.

Now, new customer orders for 100 units of the product to be shipped on day 9 and 50 units of product to be shipped on day 4 come in. The algorithm looks at the earliest request to build completion date, day 4, first, and determines whether this demand for the product can be satisfied. The algorithm first consumes the 10 units of FGOpipe on day 4 808 and converts them to customer orders 838. See FIG. 8b.

Next, the algorithm consumes the 10 units of FGOpast 836, and consumes the 10 FGOpipe 840 available today 802 (which may also be considered FGOpipe in this context) and converts them to customer orders 838, see FIG. 8c, requiring 20 more units still to be produced to satisfy the day 4 order.

Next, the algorithm consumes FGOpipe on the next day in (move right to left) with available FGOpipe, in this example, 20 units of FGOpipe on day 3 806, leaving 10 remaining, and converts the 20 units to customer orders 838, satisfying the day 4 demand. See FIG. 8d.

Now the algorithm allocates the demand for the customer order for 100 units on day 9. The algorithm first consumes the 30 units of product from ATP 842 on day 9 818. See FIG. 8e.

Next, the algorithm moves one day in (right to left) and consumes the 20 units of ATP 842 on day 8 816. Next the algorithm moves another day in and consumes the 10 units of ATP 842 on day 7 814, see FIG. 8f. Demand for 40 units of product still need to be allocated.

Next, the algorithm moves additional days in, past the demand time fence, DTF 102, until FGOpipe 840 is found to be available. In this example, the 40 units of product are consumed from FGOpipe 840 on day 5 810, leaving 10 units remaining, and satisfying the demand to produce the day 9 customer order. See FIG. 8g.

Now, a new order for 100 units comes in to be shipped on day 9. No ATP 842 between day 9 818 and DTF 102 remains. Therefore, the algorithm looks to FGOpipe and consumes the 40 units of FGOpipe on day 2 804, day 3 806 and day 5 810, see FIG. 8h, leaving 60 units that still need to be allocated.

The algorithm next consumes FGI 834 above a finished goods inventory minimum target, in this example, the minimum target is set to 0 and all 20 units of FGI 834 are consumed. See FIG. 8i.

The algorithm next consumes high flex 846, starting on day 9 818 and moving in towards DTF 102. Thus, customer orders 838 for day 7 814, day 8 816 and day 9 818 are increased to 110. See FIG. 8j. Note, demand 844 is increased to 110 for these days, reflecting the increased resource requirement.

Demand for 10 more units still need to be allocated. However, no more resources are available to meet this demand under the current plan. If the best date switch is turned off for this product, the system reports an RBCD violation to the user. On the other hand, if the best date switch is turned on for this product, the algorithm looks for the next available ATP 842 (moves left to right) and consumes 10 units of ATP 842 on day 10 820 in this example. See FIG. 8k. Since demand for this order is now satisfied, the best date, day 10, can be reported and the customer alerted to the change in its order.

For this example, assume that the best date switch is turned on. A new order comes in for 250 units on day 14. First, 80 units of ATP 842 on day 14 828 is consumed. Moving in towards DTF 102, 70 units of ATP 842 is consumed from day 13 826, 60 units from day 12 824 and 40 units from day 11 822, leaving 10 units of ATP 842 remaining on day 11 822 and satisfying the demand for the new day 14 order. See FIG. 8l.

Note that the system and method of the invention satisfies customer orders closest to the RBCD, leaving as much ATP and FGOpipe as close to today as possible. Therefore future customer orders at an earlier date may still be satisfied.

On the next day, day 2 becomes today. Because the day 7 814 demand 844 was raised to 110, daily rate 832 is now set to 110 on day 6 812. See FIG. 8m. All other days move in right to left, and a new day 15 830 having 0 customer orders 838 is added to the plan.

Note, because the targeted daily rate used to set the flex amounts is based on an average of the daily rate over the entire pipeline, as well as future forecast and past historical data, the flex amounts have not changed. However, if the daily rate over the entire pipeline is raised, then the flex amounts would move higher. Thus, the flex amounts do not change suddenly, but rather are changed only in response to a rising trend.

Orders continue to come in. Now, an order comes in for 125 units on day 15. First, 100 units of ATP 842 is consumed on day 15 830. See FIG. 8n. Demand for 25 units remain.

Next, consume 25 units of ATP 842 on the next day in, day 14 828. See FIG. 8o. The demand for this day 15 order is satisfied.

On the next day, day 2 becomes today. See FIG. 8p. Orders continue to come in. Again, all days move in right to left and a new day 15 830 is added. Now, an order comes in for 125 units on day 15. First, 100 units of ATP 842 is consumed on day 15 830. Demand for 25 units remain. Next, consume 25 units of ATP 842 on the next day in that has ATP available, in this example, day 13 826. See FIG. 8q. The demand for this day 15 order is satisfied.

On the next day, day 2 becomes today. See FIG. 8r. Orders continue to come in. Now, an order comes in for 125 units on day 15. First, 100 units of ATP 842 is consumed on day 15 830. Demand for 25 units remain. Next, consume 25 units of ATP 842 on the next day in that has ATP available, in this example, day 12 824. See FIG. 8s. The demand for this day 15 order is satisfied.

On the next day, day 2 becomes today. See FIG. 8t. Note, as day 7 814 crosses DTF 102, actual orders are less than the low flex amount 848. Therefore, 20 units of finished goods replenishment orders are scheduled to be produced. In this way, the amounts of manufacturing resources used in the production process do not vary wildly and the minimum amount of resources planned for is actually used.

Orders continue to come in. Now, an order comes in for 150 units on day 15. First, 100 units of ATP 842 is consumed on day 15 830. Demand for 50 units remain. Next, consume ATP 842 on the next day in that has ATP available, in this example, 15 units on day 11 824 and 10 units on day 7 814. See FIG. 8u. Demand for 25 units remain.

Since there is no more ATP 842 outside of DTF 102, and no more FGOpast 836 or FGI 834 available, the algorithm moves in (right to left) until it reaches the first day with FGOpipe 840 available, in this example, day 6 812. These 20 units are consumed and converted to customer orders 838. Demand for 5 units remain. Therefore, the algorithm moves out (left or right) until it reaches the first day with a flex amount available, in this example, day 7 814. Customer orders 838 for day 7 814 are increased to 105 units. See FIG. 8v. The demand for this day 15 order is satisfied.

The system and method of the invention is therefore able to accommodate unanticipated customer orders temporarily above the forecast amount without artificially raising the flex fences. In this example, the total demand is relatively stable at about 100 units per day throughout the plan. However, if customer orders continue to come in above forecast, the total demand will start moving up and the flex amounts will also move up. If the trend continues, the system may send a signal to the marketing department to adjust the forecast.

It will thus be seen that the objects set forth above, among those made apparent from the preceding description, are efficiently attained and, since certain changes may be made in carrying out the above methods and in the systems and set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there-between.

What is claimed is:

1. A method of scheduling demand for a manufacturing resource in response to a customer order for a product in a manufacturing plan including a lead time for manufacturing said product, at least one flex fence period outside said lead time and at least one updateable available resource amount associated with one of scheduled finished goods orders, finished goods inventory, available to promise resources, past due finished goods orders, unallocated customer orders, marketing orders, high flex resources and low flex resources, said method comprising the steps of:

a) inputting a customer order for a product indicative of a demand for a manufacturing resource;

b) inputting a requested completion date to manufacture said customer order;

c) retrieving a lead time for manufacturing said product and a current available resource amount for at least one of scheduled finished goods orders, finished goods inventory, available to promise resources, past due finished goods orders, unallocated customer orders, marketing orders, high flex resources and low flex resources from a manufacturing plan;

d) determining whether said requested completion date is one of inside, equal to and outside said lead time;

e) retrieving a smoothing time left fence number of days for said product before said requested completion date;

f) if said requested completion date is one of inside and equal to said lead time, consuming said demand for said manufacturing resource from among said available resource amount for said scheduled finished goods orders, said finished goods inventory, said past due finished goods orders, said unallocated customer orders and said marketing orders until said demand for said manufacturing resource is scheduled;

g) if said requested completion date is outside said lead time, consuming said demand for said manufacturing resource from among said available resource amount for said scheduled finished goods orders, said finished goods inventory, said available to promise resources, said past due finished goods orders, said unallocated customer orders, said marketing orders and said high flex resources in said smoothing time left fence until said demand for said manufacturing resource is scheduled; and h) updating each said available resource amount in said manufacturing plan from which said demand is consumed.

2. The method of claim 1 wherein said manufacturing plan further includes an average daily rate of orders, a forecast amount of orders and a historical amount of orders; and further comprising the steps of retrieving an average daily rate of orders over said lead time, a forecast amount of orders over said flex fence period and a historical amount of orders from said manufacturing plan, and determining said high flex resources and said low flex resources over said flex fence period based on a compound daily rate number including weighted components from at least one of said average daily rate of orders, said forecast amount of orders and said historical amount of orders.

3. A method of scheduling demand for a manufacturing resource in response to a customer order for a product in a manufacturing plan including a lead time for manufacturing said product, at least one flex fence period outside said lead time and at least one updateable available resource amount associated with one of scheduled finished goods orders, finished goods inventory, available to promise resources, an available to promise family of available to promise resources shared in common with a related product, past due finished goods orders, unallocated customer orders, marketing orders, high flex resources and low flex resources, said method comprising the steps of:

a) inputting a customer order for a product indicative of a demand for a manufacturing resource;

b) inputting a requested completion date to manufacture said customer order;

c) retrieving a lead time for manufacturing said product and a current available resource amount for at least one of scheduled finished goods orders, finished goods inventory, available to promise resources, past due finished goods orders, unallocated customer orders, marketing orders, high flex resources and low flex resources from a manufacturing plan;

d) determining whether said requested completion date is one of inside, equal to and outside said lead time;

e) retrieving a smoothing time left fence number of days for said product before said requested completion date;

f) if said requested completion date is one of inside and equal to said lead time, consuming said demand for said manufacturing resource from said available resource amount for at least one of said scheduled finished goods orders, said finished goods inventory, said past due finished goods orders, said unallocated customer orders and said marketing orders until said demand for said manufacturing resource is scheduled;

g) retrieving a current available resource amount for an available to promise family for said product;

h) if said requested completion date is outside said lead time, consuming said demand for said manufacturing resource from said available resource amount for at least one of said scheduled finished goods orders, said finished goods inventory, said available to promise resources, said available to promise resources shared in common with said related product in said available to promise family, said past due finished goods orders, said unallocated customer orders, said marketing orders and said high flex resources in said smoothing time left fence until said demand for said manufacturing resource is scheduled; and i) updating each said available resource amount in said manufacturing plan from which said demand is consumed.

4. The method of claim 1 wherein said manufacturing plan further includes an updateable available resource amount associated with a generic finished goods family of scheduled finished goods orders shared in common with a related product while said product and said related product are undifferentiated; and further comprising the steps of retrieving a current available resource amount for a generic finished goods family for said product, and if said requested completion date is one of inside and equal to said lead time, consuming said demand for said manufacturing resource from s aid scheduled finished goods orders shared in common with said related product in said generic finished goods family.

5. The method of claim 1 wherein said manufacturing plan further includes a maximum target for said finished goods inventory; and further comprising the steps of retrieving a maximum target for said finished goods inventory for said product, and consuming said demand for said manufacturing resource from at least one of said scheduled finished goods orders that, when added to said finished goods inventory, would exceed said maximum target, and said finished goods inventory that exceed said maximum target.

6. The method of claim 5 wherein said manufacturing plan further includes a minimum target for said finished goods inventory; and further comprising the steps of retrieving a minimum target for said finished goods inventory for said product and consuming said demand for said manufacturing resource from said finished goods inventory that exceed said minimum target.

7. A system for scheduling demand for a manufacturing resource in response to a customer order for a product in a manufacturing plan including a lead time for manufacturing said product, at least one flex fence period outside said lead time and at least one updateable available resource amount associated with one of scheduled finished goods orders, finished goods inventory, available to promise resources, past due finished goods orders, unallocated customer orders, marketing orders, high flex resources and low flex resources, said system comprising:

a) an input device for inputting a customer order for a product indicative of a demand for a manufacturing resource;

b) means for inputting a requested completion date to manufacture said customer order;

c) a database for storing a lead time for manufacturing said product and a current available resource amount for at least one of scheduled finished goods orders, finished goods inventory, available to promise resources, past due finished goods orders, unallocated customer orders, marketing orders, high flex resources and low flex resources from a manufacturing plan;

d) means for determining whether said requested completion date is one of inside, equal to and outside said lead time;

e) a smoothing time left fence number of days for said product before said requested completion date;

f) means for consuming said demand for said manufacturing resource from among said available resource amount for said scheduled finished goods orders, said finished goods inventory, said past due finished goods orders, said unallocated customer orders and said marketing orders until said demand for said manufacturing resource is scheduled when said requested completion date is one of inside and equal to said lead time;

g) means for consuming said demand for said manufacturing resource from among said available resource amount for scheduled finished goods orders, said finished goods inventory, said available to promise resources, said past due finished goods orders, said unallocated customer orders, said marketing orders and said high flex resources in said smoothing time left fence until said demand for said manufacturing resource is scheduled when said requested completion date is outside said lead time; and h) means for updating each said available resource amount in said manufacturing plan from which said demand is consumed.

8. The system of claim 7 wherein said manufacturing plan further includes an average daily rate of orders, a forecast amount of orders and a historical amount of orders; and further comprising means for retrieving an average daily rate of orders over said lead time, a forecast amount of orders over said flex fence period and a historical amount of orders from said manufacturing plan, and means for determining said high flex resources and said low flex resources over said flex fence period based on a compound daily rate number including weighted components from at least one of said average daily rate of orders, said forecast amount of orders and said historical amount of orders.

9. A system for scheduling demand for a manufacturing resource in response to a customer order for a product in a manufacturing plan including a lead time for manufacturing said product, at least one flex fence period outside said lead time and at least one updateable available resource amount associated with one of scheduled finished goods orders, finished goods inventory, available to promise resources, past due finished goods orders, unallocated customer orders, marketing orders, high flex resources and low flex resources, said system comprising:

a) an input device for inputting a customer order for a product indicative of a demand for a manufacturing resource;

b) means for inputting a requested completion date to manufacture said customer order;

c) a database for storing a lead time for manufacturing said product and a current available resource amount for at least one of scheduled finished goods orders, finished goods inventory, available to promise resources, past due finished goods orders, unallocated customer orders, marketing orders, high flex resources and low flex resources from a manufacturing plan;

d) means for determining whether said requested completion date is one of inside, equal to and outside said lead time;

e) a smoothing time left fence number of days for said product before said requested completion date;

f) means for consuming said demand for said manufacturing resource from said available resource amount for at least one of said scheduled finished goods orders, said finished goods inventory, said past due finished goods orders, said unallocated customer orders and said marketing orders until said demand for said manufacturing resource is scheduled when said requested completion date is one of inside and equal to said lead time;

g) an updateable available resource amount associated with an available to promise family of available to promise resources shared in common with a related product;

h) means for retrieving a current available resource amount for an available to promise family for said product;

i) means for consuming said demand for said manufacturing resource from said available resource amount for at least one of said scheduled finished goods orders, said finished goods inventory, said available to promise resources, said available to promise resources shared in common with said related product in said available to promise family, said past due finished goods orders, said unallocated customer orders, said marketing orders and said high flex resources in said smoothing time left fence until said demand for said manufacturing resource is scheduled when said requested completion date is outside said lead time; and j) means for updating each said available resource amount in said manufacturing plan from which said demand is consumed.

10. The system of claim 7 wherein said manufacturing plan further includes an updateable available resource amount associated with a generic finished goods family of scheduled finished goods orders shared in common with a related product while said product and said related product are undifferentiated; and further comprising means for retrieving a current available resource amount for a generic finished goods family for said product, and means for consuming said demand for said manufacturing resource from said scheduled finished goods orders shared in common with said related product in said generic finished goods family when said requested completion date is one of inside and equal to said lead time.

11. The system of claim 7 wherein said manufacturing plan further includes a maximum target for said finished goods inventory; and further comprising means for retrieving a maximum target for said finished goods inventory for said product, and means for consuming said demand for said manufacturing resource from at least one of said scheduled finished goods orders that, when added to said finished goods inventory, would exceed said maximum target, and said finished goods inventory that exceed said maximum target.

12. The system of claim 11 wherein said manufacturing plan further includes a minimum target for said finished goods inventory; and further comprising the steps of retrieving a minimum target for said finished goods inventory for said product and consuming said demand for said manufacturing resource from said finished goods inventory that exceed said minimum target.

13. The method of claim 3 wherein said manufacturing plan further includes an average daily rate of orders, a forecast amount of orders and a historical amount of orders; and further comprising the steps of retrieving an average daily rate of orders over said lead time, a forecast amount of orders over said flex fence period and a historical amount of orders from said manufacturing plan, and determining said high flex resources and said low flex resources over said flex fence period based on a compound daily rate number including weighted components from at least one of said average daily rate of orders, said forecast amount of orders and said historical amount of orders.

14. The method of claim 3 wherein said manufacturing plan further includes an updateable available resource amount associated with a generic finished goods family of scheduled finished goods orders shared in common with a related product while said product and said related product are undifferentiated; and further comprising the steps of retrieving a current available resource amount for a generic finished goods family for said product, and if said requested completion date is one of inside and equal to said lead time, consuming said demand for said manufacturing resource from said scheduled finished goods orders shared in common with said related product in said generic finished goods family.

15. The method of claim 3 wherein said manufacturing plan further includes a maximum target for said finished goods inventory; and further comprising the steps of retrieving a maximum target for said finished goods inventory for said product, and consuming said demand for said manufacturing resource from at least one of said scheduled finished goods orders that, when added to said finished goods inventory, would exceed said maximum target, and said finished goods inventory that exceed said maximum target.

16. The method of claim 15 wherein said manufacturing plan further includes a minimum target for said finished goods inventory; and further comprising the steps of retrieving a minimum target for said finished goods inventory for said product and consuming said demand for said manufacturing resource from said finished goods inventory that exceed said minimum target.

17. The system of claim 9 wherein said manufacturing plan further includes an average daily rate of orders, a forecast amount of orders and a historical amount of orders; and further comprising means for retrieving an average daily rate of orders over said lead time, a forecast amount of orders over said flex fence period and a historical amount of orders from said manufacturing plan, and means for determining said high flex resources and said low flex resources over said flex fence period based on a compound daily rate number including weighted components from at least one of said average daily rate of orders, said forecast amount of orders and said historical amount of orders.

18. The system of claim 9 wherein said manufacturing plan further includes an updateable available resource amount associated with a generic finished goods family of scheduled finished goods orders shared in common with a related product while said product and said related product are undifferentiated; and further comprising means for retrieving a current available resource amount for a generic finished goods family for said product, and means for consuming said demand for said manufacturing resource from said scheduled finished goods orders shared in common with said related product in said generic finished goods family when said requested completion date is one of inside and equal to said lead time.

19. The system of claim 9 wherein said manufacturing plan further includes a maximum target for said finished goods inventory; and further comprising means for retrieving a maximum target for said finished goods inventory for said product, and means for consuming said demand for said manufacturing resource from at least one of said scheduled finished goods orders that, when added to said finished goods inventory, would exceed said maximum target, and said finished goods inventory that exceed said maximum target.

20. The system of claim 19 wherein said manufacturing plan further includes a minimum target for said finished goods inventory; and further comprising the steps of retrieving a minimum target for said finished goods inventory for said product and consuming said demand for said manufacturing resource from said finished goods inventory that exceed said minimum target.

* * * * *